US010439417B2

(12) United States Patent
Murata

(10) Patent No.: US 10,439,417 B2
(45) Date of Patent: Oct. 8, 2019

(54) BATTERY TEMPERATURE MANAGEMENT AND CHARGING SYSTEM

(71) Applicant: TOYOTA JIDOSHA KABUSHIKI KAISHA, Toyota-shi, Aichi-ken (JP)

(72) Inventor: Takashi Murata, Kasugai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 318 days.

(21) Appl. No.: 14/932,071

(22) Filed: Nov. 4, 2015

(65) Prior Publication Data

US 2016/0126760 A1     May 5, 2016

(30) Foreign Application Priority Data

Nov. 4, 2014   (JP) ................................ 2014-224378

(51) Int. Cl.
| | |
|---|---|
| *H02J 7/00* | (2006.01) |
| *B60L 1/02* | (2006.01) |
| *B60L 53/14* | (2019.01) |
| *B60L 58/13* | (2019.01) |
| *B60L 58/27* | (2019.01) |

(52) U.S. Cl.
CPC .............. *H02J 7/007* (2013.01); *B60L 1/02* (2013.01); *B60L 53/14* (2019.02); *B60L 58/13* (2019.02); *B60L 58/27* (2019.02); *H02J 7/0031* (2013.01); *H02J 7/0042* (2013.01); *B60L 2240/545* (2013.01); *H02J 2007/0037* (2013.01); *Y02T 10/705* (2013.01); *Y02T 10/7005* (2013.01); *Y02T 10/7044* (2013.01); *Y02T 10/7072* (2013.01); *Y02T 90/14* (2013.01)

(58) Field of Classification Search
CPC ........................................................ H02J 7/007
USPC ........................................................ 320/107
See application file for complete search history.

(56) References Cited

U.S. PATENT DOCUMENTS

| | | | | |
|---|---|---|---|---|
| 5,656,916 | A | * | 8/1997 | Hotta ...................... B60L 1/003 180/65.1 |
| 6,624,615 | B1 | * | 9/2003 | Park ...................... B60L 3/0046 320/150 |
| 2004/0234865 | A1 | * | 11/2004 | Sato ........................ H01M 4/13 429/322 |

(Continued)

FOREIGN PATENT DOCUMENTS

| | | |
|---|---|---|
| CN | 102769323 A | 11/2012 |
| CN | 102934322 A | 2/2013 |

(Continued)

*Primary Examiner* — Jerry D Robbins
(74) *Attorney, Agent, or Firm* — Sughrue Mion, PLLC

(57) ABSTRACT

A battery system includes: a battery configured to be charged or discharged; a temperature sensor configured to detect a temperature of the battery; a heater configured to warm the battery; a charger configured to supply electric power from an external power supply to the battery and the heater; a relay provided in a passage through which the electric power from the charger is supplied to the battery; and a controller configured to control operations of the charger and the relay. The controller is configured to supply predetermined electric power from the charger to the heater and turn off the relay so as not to supply the electric power from the charger to the battery in a case where an SOC of the battery is equal to or more than a threshold and the temperature of the battery is lower than a predetermined temperature.

2 Claims, 10 Drawing Sheets

(56) References Cited

U.S. PATENT DOCUMENTS

| | | |
|---|---|---|
| 2006/0028167 A1 | 2/2006 | Czubay et al. |
| 2010/0270973 A1* | 10/2010 | Miyazaki ............ H01M 10/441 |
| | | 320/120 |
| 2011/0316486 A1* | 12/2011 | Inaba ...................... B60L 1/003 |
| | | 320/150 |
| 2013/0082519 A1 | 4/2013 | Nagakura et al. |
| 2013/0147424 A1* | 6/2013 | Takano ............... H01M 10/443 |
| | | 320/107 |

FOREIGN PATENT DOCUMENTS

| | | |
|---|---|---|
| CN | 103036285 A | 4/2013 |
| JP | 61-47077 A | 3/1986 |
| JP | 08-223815 A | 8/1996 |
| JP | 2003274570 A | 9/2003 |
| JP | 2006-042596 A | 2/2006 |
| JP | 2007-221885 A | 8/2007 |
| JP | 2012-191782 A | 10/2012 |
| JP | 2015-220956 A | 12/2015 |
| JP | 2015-225782 A | 12/2015 |
| WO | 2015/181614 A1 | 12/2015 |

* cited by examiner

BATTERY TEMPERATURE MANAGEMENT AND CHARGING SYSTEM

INCORPORATION BY REFERENCE

The disclosure of Japanese Patent Application No. 2014-224378 filed on Nov. 4, 2014 including the specification, drawings and abstract is incorporated herein by reference in its entirety.

BACKGROUND OF THE INVENTION

1. Field of the Invention

The invention relates to a battery system including: a battery that is charged with electric power from an external power supply; and a heater for warming a battery by receiving the electric power from the external power supply.

2. Description of Related Art

In Japanese Patent Application Publication No. 2012-191782 (JP 2012-191782 A), electric power (charging electric power) from a charger that is connected to an external power supply is supplied to a battery, so as to charge the battery. In addition, the electric power from the charger is supplied to a heater to generate heat in the heater, so as to warm the battery.

In the case where an electric power supply to the heater is shut off when the electric power from the charger is supplied to the heater and the battery, the electric power that should be supplied to the heater is supplied to the battery. Even in the case where it is attempted to lower the charging electric power of the battery in this state, the charging electric power of the battery is temporarily increased in a period from a time that the electric power supply to the heater is shut off to a time that the charging electric power of the battery is lowered. Depending on an SOC of the battery, a voltage value of the battery is possibly increased to be higher than an upper limit voltage value due to the charging electric power, which is temporarily increased.

SUMMARY OF THE INVENTION

The invention provides a battery system that suppresses an increase in charging electric power of a battery even after an electric power supply to a heater is shut off.

A battery system according to one aspect of the invention has: a battery that is charged or discharged; a temperature sensor for detecting a temperature of the battery; a heater for warming the battery; a charger for supplying electric power from an external power supply to the battery and the heater; a relay provided in a passage through which the electric power from the charger is supplied to the battery; and a controller for controlling operations of the charger and the relay. The controller supplies predetermined electric power from the charger to the heater and turns off the relay so as not to supply the electric power from the charger to the battery in the case where an SOC of the battery is equal to or more than a threshold and the temperature of the battery is lower than a predetermined temperature.

According to the above aspect of the invention, in the case where the SOC of the battery is equal to or more than the threshold and the temperature of the battery is lower than the predetermined temperature, the electric power from the charger is not supplied to the battery but only supplied to the heater. Accordingly, when a supply of the electric power to the heater is stopped, the electric power to be supplied to the heater is simply supplied to the battery. Thus, compared to a case where the electric power is supplied to the battery and the heater, an increase in charging electric power of the battery can be suppressed. When the SOC of the battery is equal to or more than the threshold, a voltage value of the battery approaches an upper limit voltage value. However, the voltage value of the battery can be suppressed from becoming higher than the upper limit voltage value by suppressing the increase in the charging electric power of the battery.

A battery system according to another aspect of the invention has: a battery that is charged or discharged; a temperature sensor for detecting a temperature of the battery; a heater for warming the battery; a charger for supplying electric power from an external power supply to the battery and the heater; and a controller for controlling an operation of the charger. The controller does not supply the electric power from the charger to the heater but supplies predetermined electric power from the charger to the battery in the case where an SOC of the battery is equal to or more than a threshold and the temperature of the battery is equal to or more than a predetermined temperature. The controller sets a total value of the electric power that is supplied from the charger to the battery and the heater to be equal to or less than the predetermined electric power in the case where the SOC of the battery is equal to or more than the threshold and the temperature of the battery is lower than the predetermined temperature.

According to the above aspect of the invention, when the electric power is supplied from the charger to the battery and the heater, the total value of the electric power that is supplied to the battery and the heater is set to be equal to or less than the predetermined electric power. Thus, when the supply of the electric power to the heater is stopped, the predetermined electric power is only supplied to the battery. The predetermined electric power is the electric power that is supplied to the battery in the case where the SOC of the battery is equal to or more than the threshold and the electric power is not supplied to the heater. Thus, even in the case where the supply of the electric power to the heater is stopped and the predetermined electric power is supplied to the battery, charging electric power of the battery can be suppressed from being excessively increased, and a voltage value of the battery can be suppressed from becoming higher than an upper limit voltage value.

When the SOC of the battery is equal to or more than the threshold, the controller can conduct constant-current constant-voltage charging by supplying the electric power from the charger to the battery. In addition, when the SOC of the battery is lower than the threshold, the controller can conduct constant-current charging by supplying the electric power from the charger to the battery. When the constant-current constant-voltage charging is conducted, the voltage value of the battery tends to be higher than the upper limit voltage value. Accordingly, in the case where the temperature of the battery is lower than the predetermined temperature and the constant-current constant-voltage charging is conducted, the total value of the electric power that is supplied from the charger to the battery and the heater is set to be equal to or less than the predetermined electric power. In this way, the voltage value of the battery can be suppressed from becoming higher than the upper limit voltage value.

In the case where the SOC of the battery is equal to or more than the threshold and the temperature of the battery is lower than the predetermined temperature, the controller conducts the constant-current charging while the electric power that is supplied from the charger to the battery is reduced stepwise in a range that is lower than the predetermined electric power. Thereafter, the controller can conduct the constant-current constant-voltage charging. When the constant-current charging and the constant-current constant-voltage charging are conducted just as described, the controller sets the total value of the electric power that is supplied from the charger to the battery and the heater to a constant value that is equal to or less than the predetermined electric power.

When the SOC of the battery is equal to or more than the threshold, the SOC of the battery is possibly increased by charging of the battery, and the voltage value of the battery possibly approaches the upper limit voltage value. Accordingly, the constant-current charging is conducted while the electric power that is supplied from the charger to the battery is reduced stepwise. Thereafter, the constant-current constant-voltage charging is conducted. Thus, the SOC of the battery can gradually be increased.

At this time, the total value of the electric power that is supplied from the charger to the battery and the heater is set to be equal to or less than the predetermined electric power. In this way, even when the supply of the electric power to the heater is stopped, the electric power that is equal to or less than the predetermined electric power is only supplied to the battery. Thus, the voltage value of the battery can be suppressed from becoming higher than the upper limit voltage value. In addition, since the total value of the electric power that is supplied to the battery and the heater is set to be constant, the electric power supplied to the heater can be increased by an amount of a stepwise reduction in the electric power supplied to the battery. Thus, the battery can easily be warmed by using the heater.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on embodiments of the invention.

Embodiment 1

Figure 1:
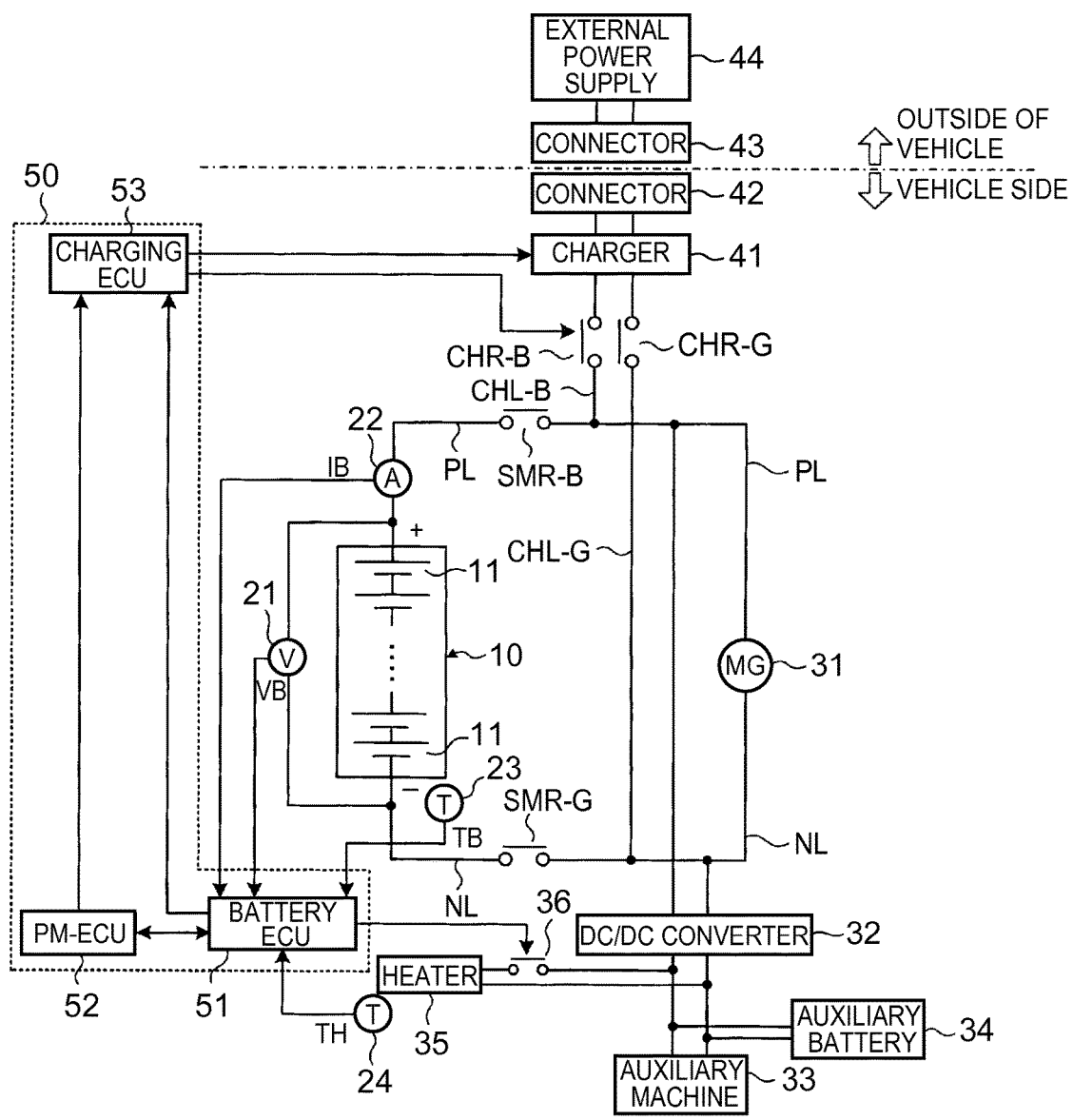
FIG. 1 is a view showing a configuration of a battery system of the invention.

FIG. 1 is a view of a configuration of a battery system of this embodiment. The battery system shown in FIG. 1 is mounted in a vehicle.

A main battery 10 has plural unit cells 11 that are connected in series. As the unit cell 11, a secondary battery, such as a nickel hydrogen battery or a lithium ion battery, can be used. The main battery 10 may include the plural unit cells 11 that are connected in parallel.

The battery system shown in FIG. 1 is controlled by an electronic control unit (ECU) 50. Here, the ECU 50 is configured by including a battery ECU 51, a power management ECU (PM-ECU) 52, and a charging ECU 53. The ECU 50 corresponds to a controller of the invention.

A voltage sensor 21 detects a voltage value VB of the main battery 10 and outputs a detection result to the battery ECU 51. A current sensor 22 detects a current value IB of the main battery 10 and outputs a detection result to the battery ECU 51. Here, the current value IB at a time that the main battery 10 is discharged is set as a positive value, and the current value IB at a time that the main battery 10 is charged is set as a negative value.

A temperature sensor 23 detects a temperature (referred to as a battery temperature) TB of the main battery 10 and outputs a detection result to the battery ECU 51. A temperature sensor 24 detects a temperature (referred to as a heater temperature) TH of a heater 35, which will be described below, and outputs a detection result to the battery ECU 51.

A positive electrode line PL is connected to a positive electrode terminal of the main battery 10, and a negative electrode line NL is connected to a negative electrode terminal of the main battery 10. The main battery 10 is connected to a motor generator (MG) 31 via the positive electrode line PL and the negative electrode line NL. The motor generator 31 receives electric power from the main battery 10 to generate kinetic energy for making a vehicle run. In other words, the vehicle can travel by transmitting the kinetic energy, which is generated by the motor generator 31, to drive wheels. In addition, the motor generator 31 can convert the kinetic energy that is generated during braking of the vehicle into the electric power and output this electric power to the main battery 10.

Here, an inverter can be arranged in a current path between the main battery 10 and the motor generator 31. The inverter can convert DC power output from the main battery 10 into AC power and output the AC power to the motor generator 31. In addition, the inverter can convert the AC power output from the motor generator 31 into the DC power and output the DC power to the main battery 10.

A pressure boosting circuit can also be arranged in the current path between the main battery 10 and the inverter. The pressure boosting circuit can boost an output voltage of the main battery 10 and output the electric power, the voltage of which has been boosted, to the inverter. In addition, the pressure boosting circuit can reduce an output voltage of the inverter and output the electric power, the voltage of which has been reduced, to the main battery 10.

The positive electrode line PL is provided with a system main relay SMR-B, and the negative electrode line NL is provided with a system main relay SMR-G. Each of the system main relays SMR-B, SMR-G is switched between on and off by receiving a control signal from the power management ECU (PM-ECU) 52. The system main relays SMR-B, SMR-G correspond to relays of the invention.

The PM-ECU 52 communicates with the battery ECU 51. The PM-ECU 52 and the battery ECU 51 are operated by receiving the electric power from an auxiliary battery 34.

The system main relays SMR-B, SMR-G are turned on when the main battery 10 and the motor generator 31 are connected. On the other hand, the system main relays SMR-B, SMR-G are turned off when the main battery 10 and the motor generator 31 are disconnected.

A DC/DC converter 32 is connected to the positive electrode line PL between the system main relay SMR-B and the motor generator 31 and the negative electrode line NL between the system main relay SMR-G and the motor generator 31. An auxiliary machine 33, the auxiliary battery 34, and the heater 35 are connected to the DC/DC converter 32. When the battery system is in an activated state, the DC/DC converter 32 reduces the output voltage of the main battery 10 and supplies the electric power, the voltage of which has been reduced, to the auxiliary machine 33 and the auxiliary battery 34. In this way, the auxiliary machine 33 can be operated, and the auxiliary battery 34 can be charged. The operation of the DC/DC converter 32 is controlled by the PM-ECU 52.

The heater 35 is used to warm the main battery 10. A heater relay 36 is provided in a current path between the DC/DC converter 32 and the heater 35, and the heater relay 36 is switched between on and off by receiving a control signal from the battery ECU 51. When the heater relay 36 is on, predetermined electric power is supplied from the DC/DC converter 32 to the heater 35, and thus heat can be generated in the heater 35. The heat generated in the heater 35 is transmitted to the main battery 10, and the main battery 10 is thus warmed.

A charging line CHL-B is connected to the positive electrode line PL between the system main relay SMR-B and the motor generator 31, and the charging line CHL-B is provided with a charging relay CHR-B. A charging line CHL-G is connected to the negative electrode line NL between the system main relay SMR-G and the motor generator 31, and a charge relay CHR-G is provided in the charging line CHL-G. Each of the charging relays CHR-B, CHR-G is switched between on and off by receiving a control signal from the charging ECU 53. The charging ECU 53 communicates with the battery ECU 51 and the PM-ECU 52. In addition, the charging ECU 53 is operated by receiving the electric power from the auxiliary battery 34.

A charger 41 is connected to the charging lines CHL-B, CHL-G. A connector (so-called inlet) 42 is connected to the charger 41 via the charging lines CHL-B, CHL-G. A connector (so-called charging plug) 43 can be connected to the connector 42. An external power supply (for example, a commercial power supply) 44 is connected to the connector 43. The connector 43 and the external power supply 44 are mounted on the outside of the vehicle.

When the connector 43 is connected to the connector 42, and the charging relays CHR-B, CHR-G and the system main relays SMR-B, SMR-G are on, the charger 41 converts the AC power from the external power supply 44 into the DC power and outputs the DC power. An operation of the charger 41 is controlled by the charging ECU 53. The DC power, which is output from the charger 41, is supplied to the main battery 10 and can be stored in the main battery 10. Charging of the main battery 10 by using the electric power from the external power supply 44 is referred to as external charging. When the external charging is conducted, the main battery 10 is charged until a state of charge (SOC) of the main battery 10 reaches a preset target value SOC_tag or higher. Here, the target value SOC_tag can be the SOC that corresponds to a full charge state, for example.

The electric power from the charger 41 is supplied not only to the main battery 10 but also to the DC/DC converter 32. Here, when the heater relay 36 is turned on, the DC/DC converter 32 reduces an output voltage of the charger 41 and can supply the electric power, the voltage of which has been reduced, (constant electric power) to the heater 35. Accordingly, when the external charging is conducted, the main battery 10 can be warmed by driving the heater 35 by using some of the electric power from the charger 41.

Next, a description will be made on processes of determining abnormalities in a temperature of the main battery 10 and a temperature of the heater 35 by using flowcharts shown in FIG. 2 and FIG. 3.

Figure 2:
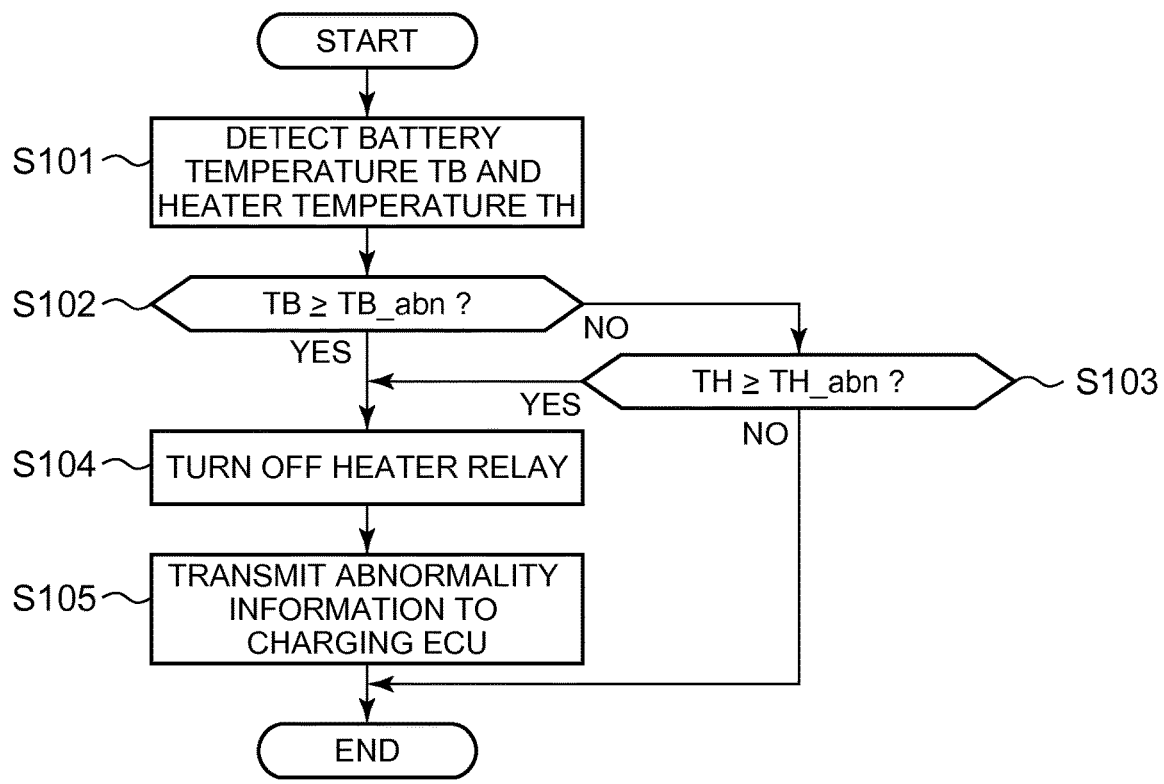
FIG. 2 is a flowchart showing a process of determining an abnormal state of heat generation in a heater of the invention.
Figure 3:
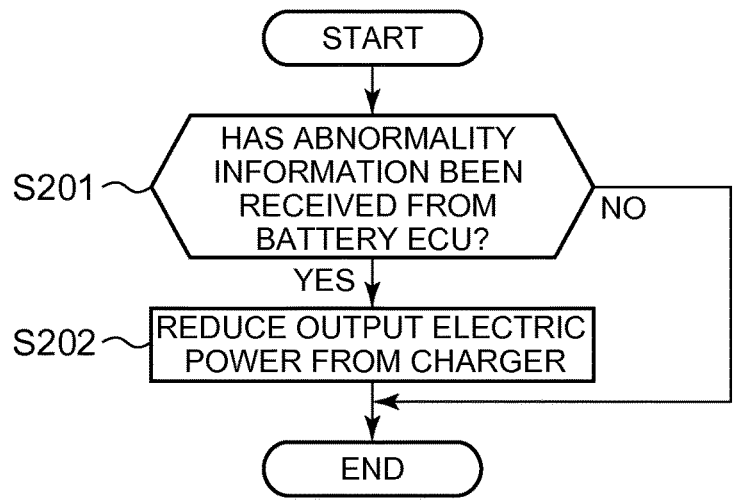
FIG. 3 is a flowchart showing a process of reducing output electric power of a charger of the invention.

The process shown in FIG. 2 is performed by the battery ECU 51. When the heater relay 36 is on, and the electric power is supplied from the DC/DC converter 32 to the heater 35 during the external charging, the process shown in FIG. 2 is repeated at predetermined intervals.

In step S101, the battery ECU 51 detects the battery temperature TB by using the temperature sensor 23 and detects the heater temperature TH by using the temperature sensor 24. In step S102, the battery ECU 51 determines whether the battery temperature TB, which is detected in the process in step S101, is equal to or more than an abnormal temperature TB_abn. The abnormal temperature TB_abn is a temperature for determining that the battery temperature TB is in an abnormal state, and is defined in advance.

When the battery temperature TB is equal to or more than the abnormal temperature TB_abn, the battery ECU 51 determines that the battery temperature TB is in the abnormal state, and performs the process in step S104. On the other hand, when the battery temperature TB is lower than the abnormal temperature TB_abn, the battery ECU 51 determines that the battery temperature TB is not in the abnormal state, and performs the process in step S103.

In step S103, the battery ECU 51 determines whether the heater temperature TH, which is detected in the process in step S101, is equal to or more than an abnormal temperature TH_abn. The abnormal temperature TH_abn is a temperature for determining that the heater temperature TH is in an abnormal state, and is defined in advance. When the heater temperature TH is equal to or more than the abnormal temperature TH_abn, the battery ECU 51 determines that the heater temperature TH is in the abnormal state, and performs the process in step S104. On the other hand, when the heater temperature TH is lower than the abnormal temperature TH_abn, the battery ECU 51 determines that the heater temperature TH is not in the abnormal state, and terminates the process shown in FIG. 2.

In step S104, the battery ECU 51 determines that the abnormal state of the battery temperature TB or the heater temperature TH is caused by the heat generation in the heater 35, and switches the heater relay 36 from on to off. Here, if the heater 35 abnormally generates heat, the heater temperature TH becomes equal to or more than the abnormal temperature TH_abn. In addition, the main battery 10 receives heat from the heater 35. Thus, if the heater 35 abnormally generates heat, the battery temperature TB becomes equal to or more than the abnormal temperature TB_abn. When the battery temperature TB is equal to or more than the abnormal temperature TB_abn, or the heater temperature TH is equal to or more than the abnormal temperature TH_abn just as described, it can be determined that the heater 35 abnormally generates heat.

Thus, when the heater relay 36 is turned off, a current flow to the heater 35 is stopped, and thus an increase in the battery temperature TB or the heater temperature TH can be suppressed. In step S105, the battery ECU 51 transmits abnormality information to the charging ECU 53. The abnormality information is information indicating that the battery temperature TB or the heater temperature TH is in the abnormal state and that the heater relay 36 is turned off.

Although the battery temperature TB and the heater temperature TH are monitored in the process shown in FIG. 2, either one of the battery temperature TB and the heater temperature TH may only be monitored. In the case where only the heater temperature TH is monitored, it can directly be determined whether the heater 35 abnormally generates heat. In this case, the heater temperature TH is detected. When the heater temperature TH is equal to or more than the abnormal temperature TH_abn, the process in steps S104, S105 shown in FIG. 2 can be performed.

On the other hand, in the case where only the battery temperature TB is monitored when the electric power is supplied to the heater 35, it can indirectly be determined whether the heater 35 abnormally generates heat. When the heater 35 abnormally generates heat, not only the heater temperature TH but also the battery temperature TB are increased. Thus, even in the case where only the battery temperature TB is monitored, it can be determined whether the heater 35 abnormally generates heat. In this case, the battery temperature TB is detected. When the battery temperature TB is equal to or more than the abnormal temperature TB_abn, the process in steps S104, S105 shown in FIG. 2 can be performed.

Next, the process shown in FIG. 3 will be described. The process shown in FIG. 3 is performed by the charging ECU 53.

In step S201, the charging ECU 53 determines whether it has received the abnormality information from the battery ECU 51. When the abnormality information is not received, the charging ECU 53 terminates the process shown in FIG. 3. On the other hand, when receiving the abnormality information, the charging ECU 53 reduces the output electric power of the charger 41 in step S202.

According to the process shown in FIG. 2, in the case where the heater relay 36 is turned off and the electric power supply to the heater 35 is stopped, the output electric power of the charger 41 has to be reduced. Otherwise, the electric power to be supplied to the heater 35 is supplied to the main battery 10. Thus, the output electric power of the charger 41 is reduced by the electric power to be supplied to the heater 35. In this way, a supply of the excess electric power to the main battery 10 can be prevented.

Figure 4:
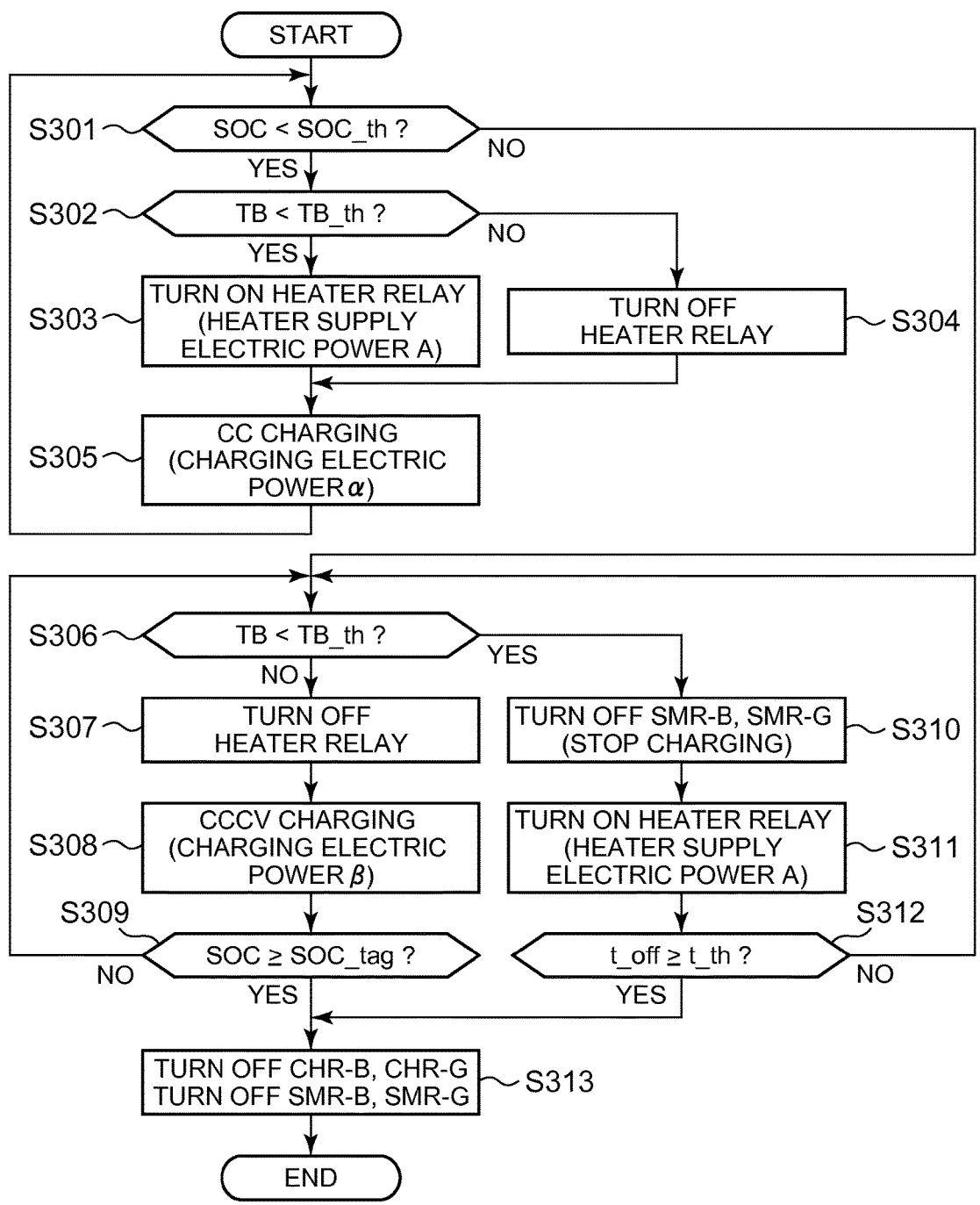
FIG. 4 is a flowchart showing a process of external charging in Embodiment 1 of the invention.

Next, a process at a time that the external charging is conducted will be described by using a flowchart shown in FIG. 4. Here, when the connector 43 is connected to the connector 42, and the charging relays CHR-B, CHR-G and the system main relays SMR-B, SMR-G are turned on, the process shown in FIG. 4 is started. When the process shown in FIG. 4 is started, the heater relay 36 is off.

In step S301, the battery ECU 51 calculates the SOC of the main battery 10 and determines whether this SOC is lower than a threshold SOC_th. A known method can appropriately be adopted as a method of calculating the SOC. More specifically, the SOC of the main battery 10 can be calculated on the basis of the voltage value VB and the current value IB. The threshold SOC_th is the SOC at a time that constant-current charging (CC charging), which will be described below, is terminated, and can be defined in advance. When the SOC is lower than the threshold SOC_th, the battery ECU 51 performs the process in step S302. On the other hand, when the SOC is equal to or more than the threshold SOC_th, the battery ECU 51 performs the process in step S306.

In step S302, the battery ECU 51 detects the battery temperature TB by using the temperature sensor 23 and determines whether this battery temperature TB is lower than a predetermined temperature TB_th. The predetermined temperature TB_th is the battery temperature TB for securing input/output performance of the main battery 10 and can be set in advance. When the battery temperature TB is lower than the predetermined temperature TB_th, the battery ECU 51 turns on the heater relay 36 in step S303. In this way, the electric power from the charger 41 can be supplied to the heater 35 via the DC/DC converter 32. Here, the electric power supplied to the heater 35 is set at electric power A. The electric power A is set in advance in consideration of such a point that the main battery 10 is warmed without excessively generating heat in the heater 35.

When the battery temperature TB is equal to or more than the predetermined temperature TB_th in step S302, the battery ECU 51 turns off the heater relay 36 in step S304. In step S305, the battery ECU 51 transmits information indicating that the SOC of the main battery 10 is lower than the threshold SOC_th to the charging ECU 53. In this way, the charging ECU 53 controls the operation of the charger 41 and conducts the CC charging.

When the CC charging is conducted, the electric power that is supplied to the main battery 10 is set at charging electric power α. The charging electric power α is set in advance. Here, when the heater relay 36 is on, the electric power output from the charger 41 is supplied not only to the main battery 10 but also to the heater 35. By obtaining information indicating that the heater relay 36 is on from the battery ECU 51, the charging ECU 53 sets the electric power output from the charger 41 to a total value of the electric power α, A.

Accordingly, the electric power A can be supplied to the heater 35 while the electric power α is supplied to the main battery 10. The main battery 10 can be warmed to increase the battery temperature TB by supplying the electric power A to the heater 35. It should be noted that the electric power output from the charger 41 can be the electric power that is higher than the total value of the electric power α, A in consideration of the electric power that is supplied from the DC/DC converter 32 to the auxiliary machine 33 and the auxiliary battery 34.

Meanwhile, when the heater relay 36 is off, the electric power output from the charger 41 is supplied to the main battery 10 but is not supplied to the heater 35. The charging ECU 53 sets the electric power output from the charger 41 at the electric power α by obtaining information indicating that the heater relay 36 is off from the battery ECU 51. In this way, the electric power α can be supplied from the charger 41 to the main battery 10. It should be noted that the electric power output from the charger 41 can be the electric power that is higher than the electric power α in consideration of the electric power that is supplied from the DC/DC converter 32 to the auxiliary machine 33 and the auxiliary battery 34.

In step S306, the battery ECU 51 detects the battery temperature TB by using the temperature sensor 23 and determines whether this battery temperature TB is lower than the predetermined temperature TB_th. When the battery temperature TB is lower than the predetermined temperature TB_th, the battery ECU 51 determines that the electric power needs to be supplied to the heater 35, and performs the process in step S310. On the other hand, when the battery temperature TB is equal to or more than the predetermined temperature TB_th, the battery ECU 51 determines that the supply of the electric power to the heater 35 is unnecessary, and performs the process in step S307.

In step S307, the battery ECU 51 turns off the heater relay 36. In this way, the supply of the electric power from the charger 41 to the heater 35 can be stopped. In step S308, the battery ECU 51 transmits information indicating that the SOC of the main battery 10 is equal to or more than the threshold SOC_th and the heater relay 36 is off to the charging ECU 53. Accordingly, the charging ECU 53 conducts constant-current constant-voltage charging (CCCV charging) by controlling the operation of the charger 41. The electric power supplied to the main battery 10 during the CCCV charging is set at electric power β. The charging electric power β is lower than the electric power α that is supplied to the main battery 10 during the CC charging, and is set in advance.

In step S309, the battery ECU 51 calculates the SOC of the main battery 10 and determines whether this SOC is equal to or more than the target value SOC_tag. When the SOC of the main battery 10 is lower than the target value SOC_tag, the battery ECU 51 returns the process to step S306. On the other hand, when the SOC of the main battery 10 is equal to or more than the target value SOC_tag, the battery ECU 51 performs the process in step S313.

When proceeding with the processes from step S309 to step S313, the battery ECU 51 transmits information indicating that the SOC of the main battery 10 is equal to or more than the target value SOC_tag to the charging ECU 53 and the PM-ECU 52 in step S313. Accordingly, the charging ECU 53 turns off the charging relays CHR-B, CHR-G. In addition, the PM-ECU 52 turns off the system main relays SMR-B, SMR-G. In this way, the external charging is terminated.

In step S310, the battery ECU 51 transmits information indicating that the electric power needs to be supplied to the heater 35 to the PM-ECU 52. Accordingly, the PM-ECU 52 turns off the system main relays SMR-B, SMR-G. By turning off the system main relays SMR-B, SMR-G, the electric power from the charger 41 is not supplied to the main battery 10, and the charging of the main battery 10 is not conducted.

In step S311, the battery ECU 51 turns on the heater relay 36. In this way, the electric power from the charger 41 is supplied to the heater 35 via the DC/DC converter 32, and thus the main battery 10 can be warmed by using the heater 35. Here, the charging ECU 53 controls the operation of the charger 41 by obtaining information indicating that the SOC of the main battery 10 is equal to or more than the threshold SOC_th and the heater relay 36 is on from the battery ECU 51. That is, the charging ECU 53 supplies the electric power A to the heater 35 by setting the electric power output from the charger 41 as the electric power A.

In step S312, the battery ECU 51 obtains a time t_off in which the system main relays SMR-B, SMR-G remain off from the PM-ECU 52, and determines whether the time t_off is equal to or more than a predetermined time t_th. Here, the PM-ECU 52 can measure the time t_off by using a timer. When the time t_off is shorter than the predetermined time t_th, the battery ECU 51 returns to the process in step S306. On the other hand, when the time t_off is equal to or more than the predetermined time t_th, the battery ECU 51 performs the process in step S313.

When proceeding with the process from step S312 to step S313, the battery ECU 51 transmits information indicating that the time t_off is equal to or more than the predetermined time t_th to the charging ECU 53 and the PM-ECU 52 in step S313. Accordingly, the charging ECU 53 turns off the charging relays CHR-B, CHR-G. In addition, the battery ECU 51 turns off the heater relay 36. Here, since the system main relays SMR-B, SMR-G are off by the process in step S310, the system main relays SMR-B, SMR-G remain off in the process in step S313.

In this way, the electric power from the charger 41 is supplied to neither the main battery 10 nor the DC/DC converter 32, and the supply of the electric power to the heater 35 is also stopped. The external charging can be terminated by turning off the charging relays CHR-B, CHR-G and the system main relays SMR-B, SMR-G.

Figure 5:
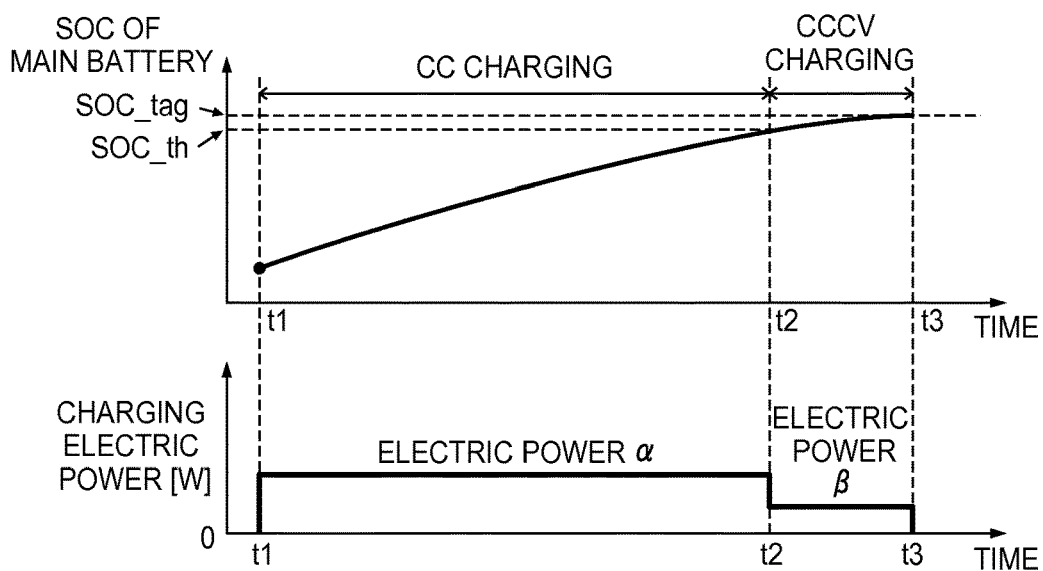
FIG. 5 is a diagram showing a change in an SOC of a main battery and a change in charging electric power at a time that the heater is in a state where the electric power does not flow therethrough in Embodiment 1 of the invention.

FIG. 5 shows a change in the SOC of the main battery 10 and the electric power (the charging electric power) supplied to the main battery 10 at a time that the external charging is conducted without supplying the electric power from the charger 41 to the heater 35. In FIG. 5, a horizontal axis indicates time, and a vertical axis indicates the SOC of the main battery 10 and the charging electric power.

At time t1, the external charging is started. Since the SOC of the main battery 10 at the time t1 is lower than the threshold SOC_th, the CC charging at the charging electric power α is conducted at the time t1 onward. As the CC charging progresses, the SOC of the main battery 10 is increased, and the SOC of the main battery 10 reaches the threshold SOC_th at time t2.

Since the SOC of the main battery 10 becomes equal to or more than the threshold SOC_th at the time t2, the CC charging is switched to the CCCV charging. The charging electric power at a time that the CCCV charging is conducted is set at the electric power β. At the time t2 onward, the SOC of the main battery 10 is gradually increased and approaches the target value SOC_tag. Here, the electric power β is lower than the electric power α. Thus, in terms of an amount of an increase in the SOC of the main battery 10 per unit time, an amount of the increase during the CCCV charging is smaller than an amount of the increase during the CC charging. At time t3, the SOC of the main battery 10 reaches the target value SOC_tag, and the charging relays CHR-B, CHR-G and the system main relays SMR-B, SMR-G are thereby turned off. In this way, the CCCV charging (that is, the external charging) is terminated.

Figure 6:
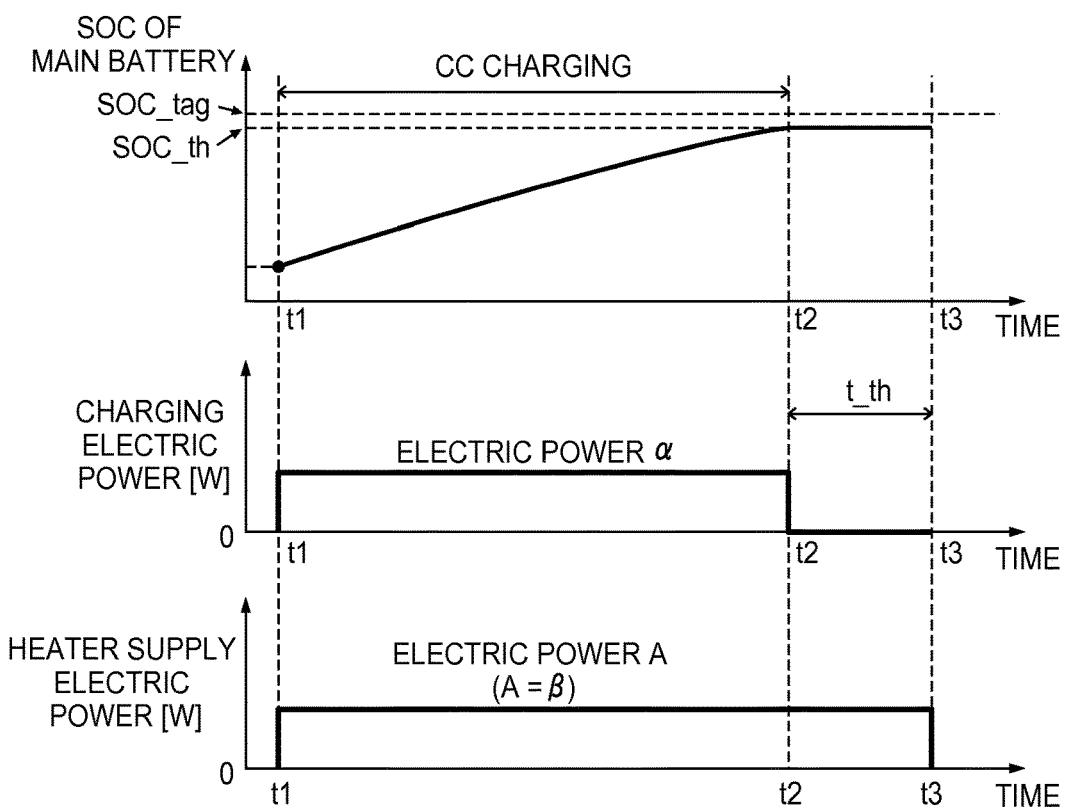
FIG. 6 is a diagram showing the change in the SOC of the main battery, the change in the charging electric power, and electric power supplied to the heater at a time that the heater is in a state that the electric power flows therethrough in Embodiment 1 of the invention.

FIG. 6 shows the change in the SOC of the main battery 10 associated with the external charging, the charging electric power during the external charging, and the electric power supplied to the heater 35 at a time that the electric power is supplied from the charger 41 to the heater 35. In FIG. 6, a horizontal axis indicates time, and a vertical axis indicates the SOC of the main battery 10, the charging electric power, and the electric power supplied to the heater 35.

Similar to FIG. 5, the CC charging at the charging electric power α is conducted from the time t1 to the time t2. The electric power output from the charger 41 is also supplied to the heater 35, and the electric power supplied to the heater 35 is the electric power A. In an example shown in FIG. 6, the electric power A keeps being supplied from the charger 41 to the heater 35 at the time t2 onward. Meanwhile, at the time t2 onward, the charging electric power of the main battery 10 is 0 [W], and the charging of the main battery 10 is not conducted. Thus, the SOC of the main battery 10 remains to be the threshold SOC_th.

A time between the time t2 and the time t3 corresponds to the predetermined time t_th. At the time t3, the electric power supplied from the charger 41 to the heater 35 is shut off by turning off the charging relays CHR-B, CHR-G.

According to this embodiment, in the case where the electric power is supplied from the charger 41 to the heater 35 after the SOC of the main battery 10 reaches the threshold SOC_th, the charging of the main battery 10 is not conducted. That is, in the time between the time t2 and the time t3 that is shown in FIG. 6, the electric power A is supplied to the heater 35, and the charging electric power is set at 0 [W].

In this way, it is possible to suppress the battery temperature TB and the heater temperature TH from becoming the abnormal states and to suppress the voltage value VB of the main battery 10 from becoming higher than an upper limit voltage value VB_lim when the heater relay 36 is turned off by the process shown in FIG. 2. A specific description will be made on this point by using FIG. 7.

At time t21 after the time t2, the battery temperature TB becomes equal to or more than the abnormal temperature TB_abn, or the heater temperature TH becomes equal to or more than the abnormal temperature TH_abn. Accordingly, the heater relay 36 is turned off. In the process in step S105 that is shown in FIG. 2, the abnormality information is transmitted from the battery ECU 51 to the charging ECU 53, and the charging ECU 53 reduces the output electric power of the charger 41 on the basis of the process shown in FIG. 3.

Just as described, a time lag is produced from time at which the heater relay 36 is turned off to time at which the charger 41 starts reducing the output electric power. This time lag includes a time in which the battery ECU 51 transmits the abnormality information to the charging ECU 53 and a time in which the operation of the charger 41 is controlled to reduce the output electric power of the charger 41. This time lag corresponds to a time between the time t21 and time t22.

In the time between the time t21 and the time t22, the heater relay 36 is turned off, but the output electric power of the charger 41 cannot be reduced. Accordingly, in the time between the time t21 and the time t22, the electric power to be supplied to the heater 35 is supplied as the charging electric power to the main battery 10, and the charging electric power of the main battery 10 is temporarily increased. When the charging electric power of the main battery 10 is increased, the voltage value VB is also increased by an amount of a voltage variation that is associated with an increase in a current value (charging current) IB.

At the time t2 onward, the SOC of the main battery 10 is equal to or more than the threshold SOC_th, the SOC of the main battery 10 approximates the target value SOC_tag, and the voltage value VB approaches the upper limit voltage value VB_lim. In the case where the charging electric power of the main battery 10 is increased in this state, the voltage value VB possibly becomes higher than the upper limit voltage value VB_lim.

According to this embodiment, the main battery 10 is not charged when the electric power A is supplied to the heater 35. Accordingly, in the time between the time t21 and the time t22, the electric power A to be supplied to the heater 35 is only supplied to the main battery 10. Thus, compared to a case where the electric power is supplied to the main battery 10 and the heater 35, an increase in the charging electric power of the main battery 10 can be suppressed. In this way, even in the case where the electric power A is supplied to the main battery 10 and the voltage value VB is thus increased, the voltage value VB can be suppressed from becoming higher than the upper limit voltage value VB_lim.

Typically, the electric power A that is supplied to the heater 35 tends to be lower than the charging electric power β. Thus, even in the case where the electric power A to be supplied to the heater 35 is supplied to the main battery 10, the voltage value VB can be suppressed from becoming higher than the upper limit voltage value VB_lim.

Figure 7:
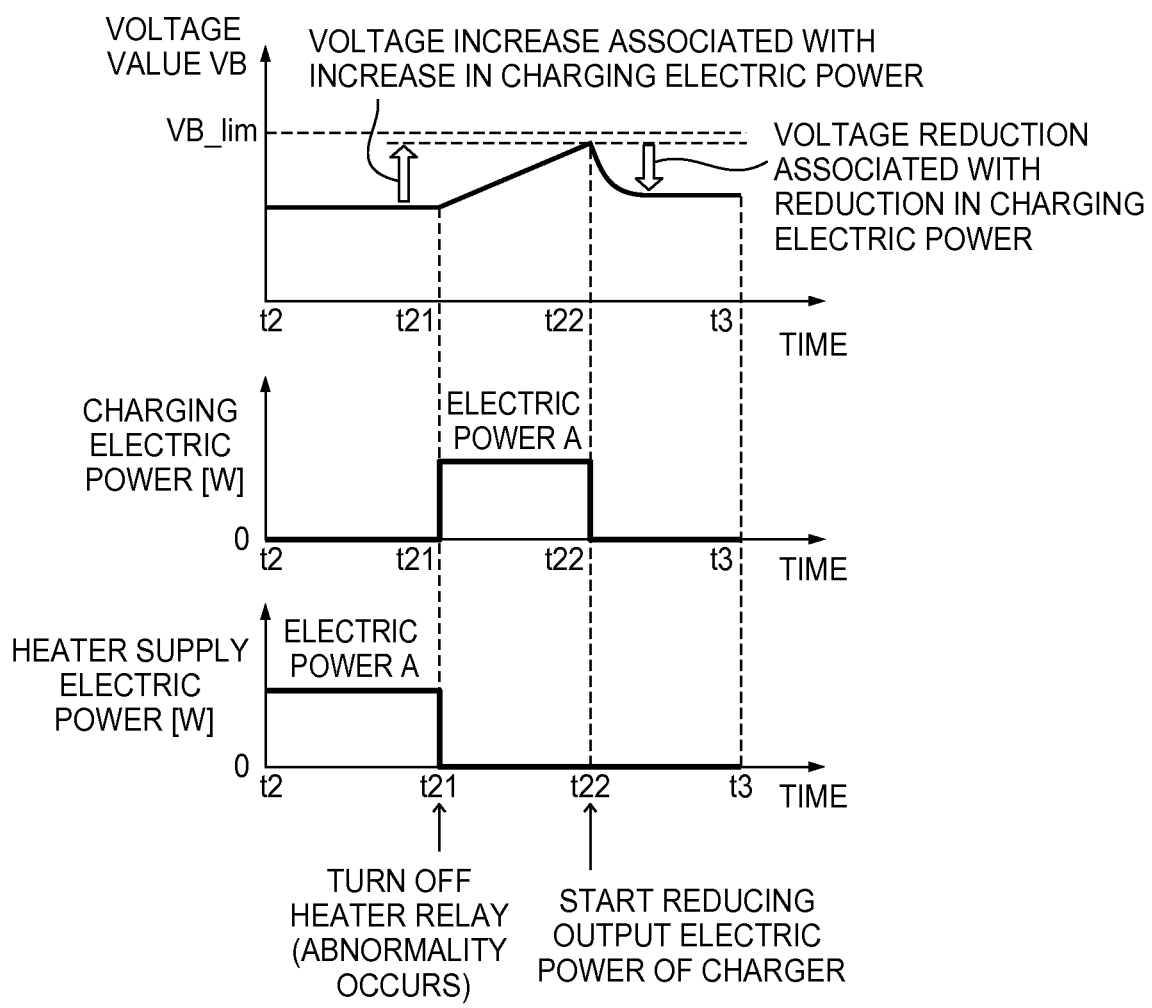
FIG. 7 is a diagram showing a change in a voltage value of the main battery at a time that the electric power to be supplied to the heater of the invention is supplied to the main battery.

Here, in the case where the electric power A is supplied to the heater 35 and the charging electric power β is supplied to the main battery 10 at the time t2 onward, in the time between the time t21 and the time t22 that is shown in FIG. 7, the charging electric power of the main battery 10 becomes a total value of the electric power A, β and thus becomes higher than the electric power A. Accordingly, there is a case where the voltage value VB temporarily becomes higher than the upper limit voltage value VB_lim. When the lithium ion secondary battery is used as the unit cell 11, lithium is possibly deposited due to a fact that the voltage value VB becomes higher than the upper limit voltage value VB_lim. When lithium is deposited, full charge capacity of the unit cell 11 is reduced.

According to this embodiment, as described above, the charging of the main battery 10 is not conducted when the electric power A is supplied to the heater 35. Thus, in the time between the time t21 and the time t22 that is shown in FIG. 7, an excessive increase in the charging electric power of the main battery 10 can be suppressed, and thus the voltage value VB can be suppressed from becoming higher than the upper limit voltage value VB_lim. Here, when the lithium ion secondary battery is used as the unit cell 11, it is possible to suppress the deposition of lithium associated with the fact that the voltage value VB becomes higher than the upper limit voltage value VB_lim.

At the time t22, the charging electric power of the main battery 10 can be set at 0 [W] by reducing the output electric power of the charger 41 by the electric power A that is supplied to the heater 35. In this way, the current stops flowing to the main battery 10, and the voltage value VB is reduced to an open circuit voltage (OCV) at the time t22 onward.

In this embodiment, in the case where the SOC of the main battery 10 is lower than the threshold SOC_th and the battery temperature TB is lower than the predetermined temperature TB_th, the electric power from the charger 41 is supplied to the main battery 10 and the heater 35. In the case where the SOC of the main battery 10 is lower than the threshold SOC_th, the voltage value VB is unlikely to become higher than the upper limit voltage value VB_lim even when the electric power to be supplied to the heater 35 is supplied to the main battery 10 by turning off the heater relay 36. Thus, in the case where the SOC of the main battery 10 is lower than the threshold SOC_th and the battery temperature TB is lower than the predetermined temperature TB_th, the electric power from the charger 41 is supplied to the main battery 10 and the heater 35.

It should be noted that the process in step S313 is performed when the time t_off becomes equal to or more than the predetermined time t_th in the process in step S312 shown in FIG. 4. However, the invention is not limited thereto. A process, which will be described below, can be performed instead of the process in step S312.

For example, when time at which the external charging is terminated (charging termination time) is set, current time is obtained by using a clock, and it is determined whether this current time is the charging termination time. When the current time is the charging termination time, the process in step S313 can be performed. On the other hand, when the current time is prior to the charging termination time, the process can be returned to step S306. It should be noted that, in the case where the CCCV charging is conducted without supplying the electric power to the heater 35, the CCCV charging is conducted such that the SOC of the main battery 10 becomes equal to or more than the target value SOC_tag by the charging termination time.

Embodiment 2

A description will be made on Embodiment 2 of the invention. In this embodiment, different points from Embodiment 1 are mainly described.

In Embodiment 1, in the case where the electric power is supplied to the heater 35 after the SOC of the main battery 10 reaches the threshold SOC_th, the electric power is not supplied to the main battery 10. On the other hand, in this embodiment, after the SOC of the main battery 10 reaches the threshold SOC_th, the electric power is supplied to the heater 35, and the CCCV charging is also conducted by supplying the electric power to the main battery 10.

Figure 8:
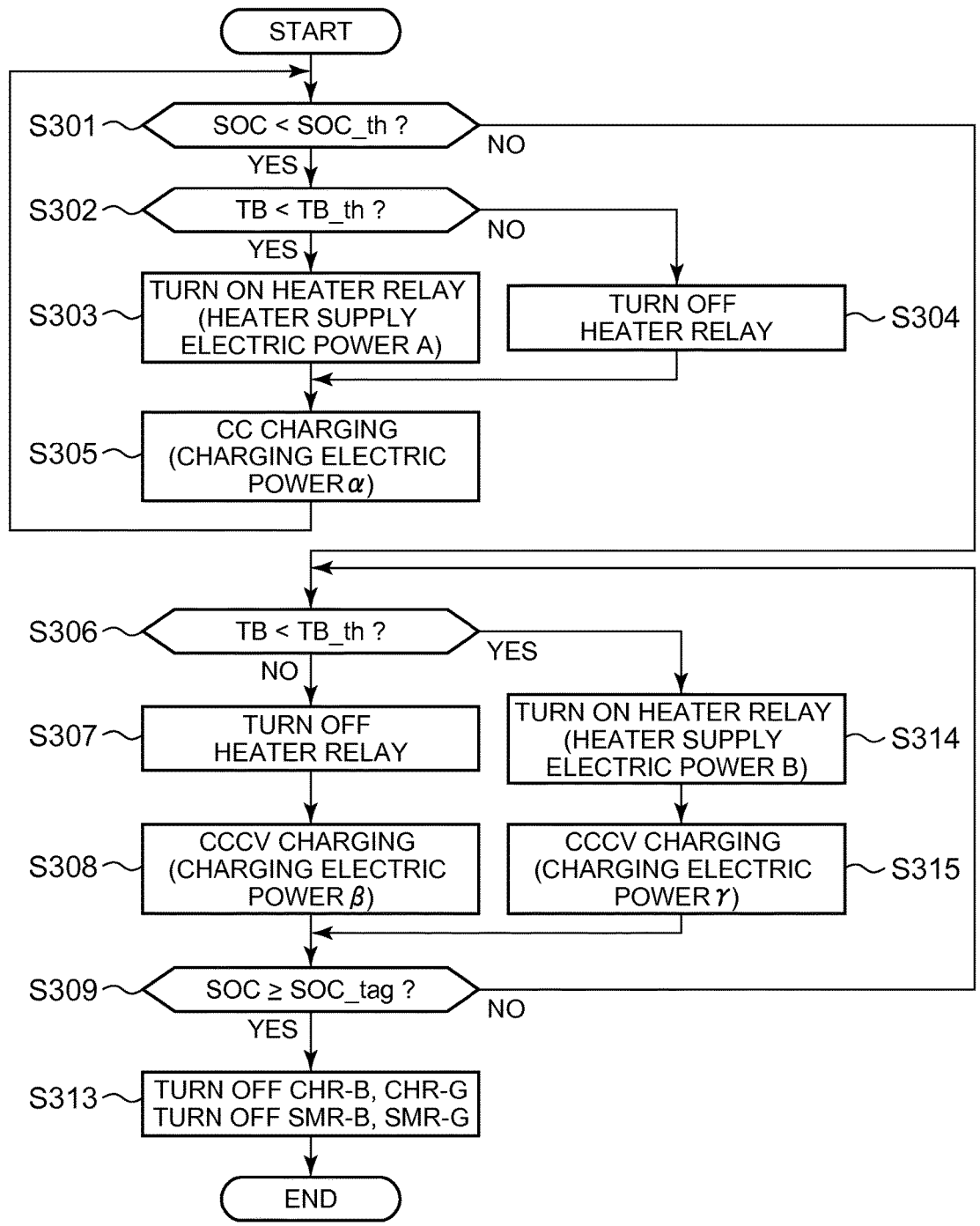
FIG. 8 is a flowchart showing a process of the external charging in Embodiment 2 of the invention.

A process of the external charging in this embodiment will be described by using a flowchart shown in FIG. 8. FIG. 8 is a chart that corresponds to FIG. 4, and the same processes as the processes described in FIG. 4 are denoted by the same reference numerals. In the process shown in FIG. 8, different points from the process shown in FIG. 4 will hereinafter be mainly described.

In step S306, when the battery temperature TB is lower than the predetermined temperature TB_th, the battery ECU 51 turns on the heater relay 36 in step S314. Here, when the heater relay 36 is already on, the electric power that is supplied from the DC/DC converter 32 to the heater 35 is set at electric power B.

In step S315, the battery ECU 51 transmits information indicating that the SOC of the main battery 10 is equal to or more than the threshold SOC_th and the heater relay 36 is on to the charging ECU 53. Accordingly, the charging ECU 53 conducts the CCCV charging by controlling the operation of the charger 41. The electric power that is supplied to the main battery 10 during the CCCV charging is set at electric power γ. Here, a total value of the electric power γ and the electric power B is set at the electric power β. It should be noted that the total value of the electric power γ, B may be a value that is higher than 0 [W] and lower than the electric power β. After the process in step S315, the process in step S309 is performed.

Figure 9:
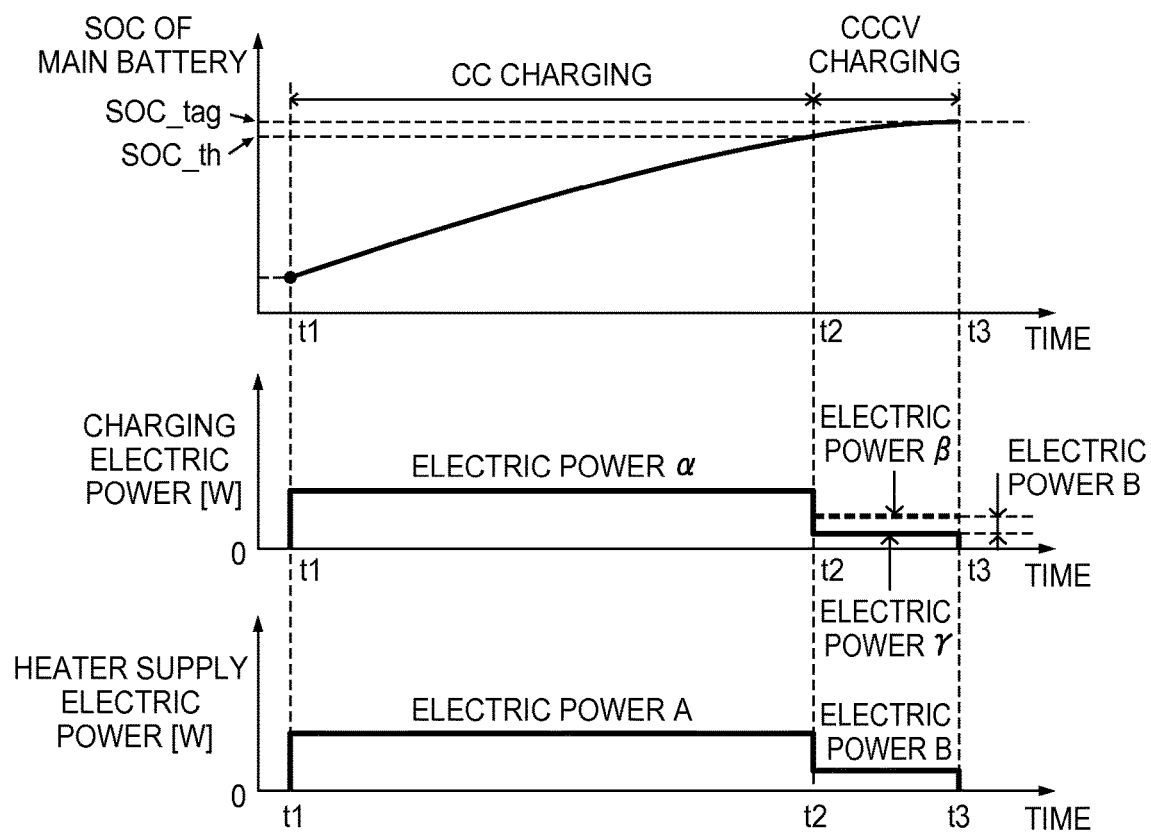
FIG. 9 is a diagram showing a change in the SOC of the main battery, a change in the charging electric power, and a change in the electric power supplied to the heater at the time that the heater is in the state that the electric power flows therethrough in Embodiment 2 of the invention.

FIG. 9 shows a change in the SOC of the main battery 10, a change in the charging electric power, and a change in the electric power supplied to the heater 35 at a time that the processes shown in FIG. 8 are performed. FIG. 9 is a chart that corresponds to FIG. 6.

As shown in FIG. 9, the CC charging is conducted at the electric power α from the time t1 at which the external charging is started to the time t2. In addition, the electric power A is supplied to the heater 35 from the time t1 to the time t2. At the time t2, the SOC of the main battery 10 reaches the threshold SOC_th, and the CC charging is terminated.

In an example shown in FIG. 9, the electric power is continuously supplied to the heater 35 at the time t2 onward. However, the electric power that is supplied to the heater 35 is reduced from the electric power A to the electric power B at the time t2. In addition, the CCCV charging is conducted at the charging electric power γ at the time t2 onward. Here, the total value of the electric power γ and the electric power B is the electric power β.

The total value of the electric power γ, B only needs to be the electric power β. Accordingly, unlike the example shown in FIG. 9, the electric power that is supplied to the heater 35 may not have to be reduced from the electric power A to the electric power B. That is, at the time t2 onward, it may be possible to keep supplying the electric power A to the heater 35.

In the case where the electric power is not supplied to the heater 35 at the time t2 onward, as it has been described by using FIG. 5, the electric power β is supplied to the main battery 10, so as to conduct the CCCV charging.

In this embodiment, since the CCCV charging is conducted by supplying the electric power γ to the main battery 10 in the time between the time t2 and the time t3, the SOC of the main battery 10 can reach the target value SOC_tag. In addition, since the electric power B is supplied to the heater 35 in the time between the time t2 and the time t3, the main battery 10 can be warmed by using the heater 35.

In the case where the battery temperature TB or the heater temperature TH becomes the abnormal state and thus the heater relay 36 is turned off by the process shown in FIG. 2 in the time between the time t2 and the time t3, the electric power that is supplied to the main battery 10 is increased by the electric power B. At this time, the electric power that is supplied to the main battery 10 is the total value of the electric power γ and the electric power B, and this total value is the electric power β that is supplied to the main battery at the time that the CCCV charging is conducted without supplying the electric power to the heater 35. In the CCCV charging with the electric power β, the main battery 10 is charged such that the voltage value VB does not become higher than the upper limit voltage value VB_lim. Thus, even in the case where the charging electric power of the main battery 10 is increased by turning off the heater relay 36, the voltage value VB can be suppressed from becoming higher than the upper limit voltage value VB_lim.

Embodiment 3

A description will be made on Embodiment 3 of the invention. In this embodiment, different points from Embodiment 2 are mainly described.

In Embodiment 2, the CC charging is conducted at the constant electric power α until the SOC of the main battery 10 reaches the threshold SOC_th. In this embodiment, the charging electric power during the CC charging is reduced before the SOC of the main battery 10 reaches the threshold SOC_th. Then, after the SOC of the main battery 10 reaches the threshold SOC_th, similar to Embodiment 2, the CCCV charging is conducted by supplying the electric power to the main battery 10 regardless of whether the electric power is supplied to the heater 35.

Figure 10:
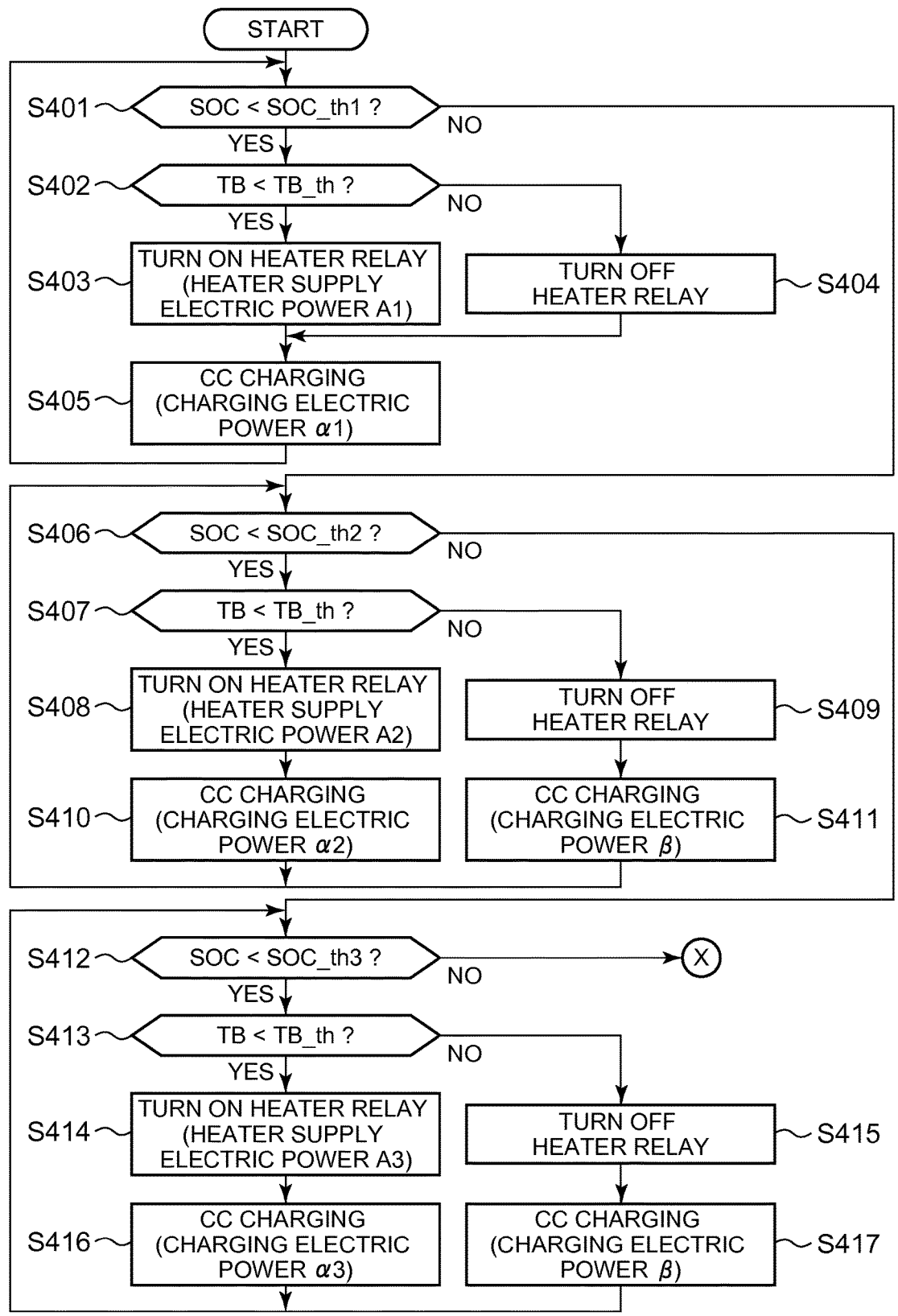
FIG. 10 is a flowchart showing a process of the external charging in Embodiment 3 of the invention.
Figure 11:
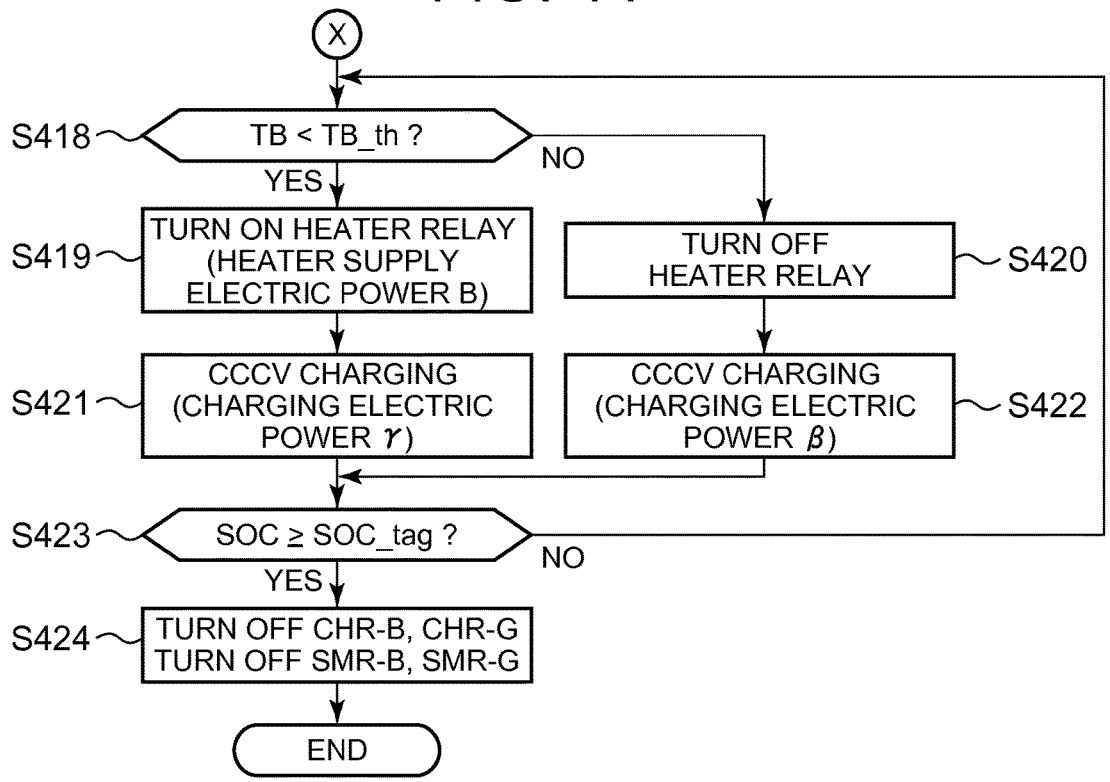
FIG. 11 is a flowchart showing the process of the external charging in Embodiment 3 of the invention.

A process of the external charging in this embodiment will be described by using a flowchart shown in FIG. 10 and FIG. 11. FIG. 10 and FIG. 11 are charts that correspond to FIG. 8.

In step S401, the battery ECU 51 calculates the SOC of the main battery 10 and determines whether this SOC is lower than a first threshold (corresponding to a threshold of the invention) the SOC_th1. The first threshold SOC_th1 is a lower value than the target value SOC_tag and can be set in advance. When the SOC of the main battery 10 is lower than the first threshold SOC_th1, the battery ECU 51 proceeds with the process to step S402. On the other hand, when the SOC of the main battery 10 is equal to or more than the first threshold SOC_th1, the battery ECU 51 proceeds with the process to step S406.

In step S402, the battery ECU 51 detects the battery temperature TB by using the temperature sensor 23 and determines whether this battery temperature TB is lower than the predetermined temperature TB_th. When the battery temperature TB is lower than the predetermined temperature TB_th, the battery ECU 51 turns on the heater relay 36 in step S403. Here, the electric power supplied to the heater 35 is set at electric power A1. On the other hand, when the battery temperature TB is equal to or more than the predetermined temperature TB_th, the battery ECU 51 turns off the heater relay 36 in step S404.

In step S405, the battery ECU 51 transmits information indicating that the SOC of the main battery 10 is lower than the first threshold SOC_th1 to the charging ECU 53. Accordingly, the charging ECU 53 conducts the CC charging by supplying electric power $\alpha 1$ from the charger 41 to the main battery 10. The charging electric power $\alpha 1$ is the same as the charging electric power $\alpha$ that has been described in Embodiment 2. After the process in step S405, the process is returned to step S401.

When the CC charging is conducted and the heater relay 36 is on, the electric power output from the charger 41 is supplied not only to the main battery 10 but also to the heater 35. By obtaining information indicating that the heater relay 36 is on from the battery ECU 51, the charging ECU 53 sets the electric power output from the charger 41 to a total value of the electric power A1, $\alpha 1$. In this way, the electric power A1 can be supplied to the heater 35 while the electric power $\alpha 1$ is supplied to the main battery 10. It should be noted that the electric power output from the charger 41 can be the electric power that is higher than the total value of the electric power A1, $\alpha 1$ also in consideration of the electric power that is supplied from the DC/DC converter 32 to the auxiliary machine 33 and the auxiliary battery 34.

Meanwhile, when the heater relay 36 is off, the electric power output from the charger 41 is supplied to the main battery 10 but is not supplied to the heater 35. The charging ECU 53 sets the electric power output from the charger 41 at the electric power $\alpha 1$ by obtaining information indicating that the heater relay 36 is off from the battery ECU 51. In this way, the electric power $\alpha 1$ can be supplied from the charger 41 to the main battery 10. It should be noted that the electric power output from the charger 41 can be the electric power that is higher than the electric power $\alpha 1$ also in consideration of the electric power that is supplied from the DC/DC converter 32 to the auxiliary machine 33 and the auxiliary battery 34.

In step S406, the battery ECU 51 calculates the SOC of the main battery 10 and determines whether this SOC is lower than a second threshold SOC_th2. The second threshold SOC_th2 is a value that is lower than the target value SOC_tag and higher than the first threshold SOC_th1, and can be set in advance. When the SOC of the main battery 10 is lower than the second threshold SOC_th2, the battery ECU 51 proceeds with the process in step S407. On the other hand, when the SOC of the main battery 10 is equal to or more than the second threshold SOC_th2, the battery ECU 51 proceeds with the process in step S412.

In step S407, the battery ECU 51 detects the battery temperature TB by using the temperature sensor 23 and determines whether this battery temperature TB is lower than the predetermined temperature TB_th. When the battery temperature TB is lower than the predetermined temperature TB_th, the battery ECU 51 turns on the heater relay 36 in step S408. Here, the electric power supplied to the heater 35 is set at electric power A2. On the other hand, when the battery temperature TB is equal to or more than the predetermined temperature TB_th, the battery ECU 51 turns off the heater relay 36 in step S409.

In step S410, the battery ECU 51 transmits information indicating that the SOC of the main battery 10 is lower than the second threshold SOC_th2 and the heater relay 36 is on to the charging ECU 53. Accordingly, the charging ECU 53 conducts the CC charging by supplying electric power $\alpha 2$ from the charger 41 to the main battery 10. The charging electric power $\alpha 2$ is lower than the charging electric power $\alpha 1$ that is set in the process in step S405. After the process in step S410, the process is returned to step S406. When the CC charging is conducted at the charging electric power $\alpha 2$ and the electric power A2 is supplied to the heater 35, the electric power output from the charger 41 is a total value of the electric power $\alpha 2$, A2. Here, the total value of the electric power $\alpha 2$, A2 is set at the electric power $\beta$. It should be noted that, when the electric power is supplied to the auxiliary battery 34 and the auxiliary machine 33, this amount of the electric power can also be output from the charger 41.

In step S411, the battery ECU 51 transmits information indicating that the SOC of the main battery 10 is lower than the second threshold SOC_th2 and the heater relay 36 is off to the charging ECU 53. Accordingly, the charging ECU 53 conducts the CC charging by supplying the electric power $\beta$ from the charger 41 to the main battery 10. The charging electric power $\beta$ is lower than the charging electric power $\alpha 1$ that is set in the process in step S405. After the process in step S411, the process is returned to step S406. When the CC charging is conducted at the charging electric power $\beta$, the electric power is not supplied to the heater 35. Thus, the electric power output from the charger 41 is the electric power $\beta$. It should be noted that, when the electric power is supplied to the auxiliary battery 34 and the auxiliary machine 33, this amount of the electric power can also be output from the charger 41.

In step S412, the battery ECU 51 calculates the SOC of the main battery 10 and determines whether this SOC is lower than a third threshold SOC_th3. The third threshold SOC_th3 is a value that is lower than the target value SOC_tag and higher than the second threshold SOC_th2, and can be set in advance. The third threshold SOC_th3 is the same value as the threshold SOC_th that has been described in Embodiments 1, 2.

When the SOC of the main battery 10 is lower than the third threshold SOC_th3, the battery ECU 51 proceeds with the process in step S413. On the other hand, when the SOC of the main battery 10 is equal to or more than the third threshold SOC_th3, the battery ECU 51 proceeds with the process in step S418.

In step S413, the battery ECU 51 detects the battery temperature TB by using the temperature sensor 23 and determines whether this battery temperature TB is lower than the predetermined temperature TB_th. When the battery temperature TB is lower than the predetermined temperature TB_th, the battery ECU 51 turns on the heater relay 36 in step S414. Here, the electric power supplied to the heater 35 is set at electric power A3. On the other hand, when the battery temperature TB is equal to or more than the predetermined temperature TB_th, the battery ECU 51 turns off the heater relay 36 in step S415.

In step S416, the battery ECU 51 transmits information indicating that the SOC of the main battery 10 is lower than the third threshold SOC_th3 and the heater relay 36 is on to the charging ECU 53. Accordingly, the charging ECU 53 conducts the CC charging by supplying electric power α3 from the charger 41 to the main battery 10. After the process in step S416, the process is returned to step S412. The charging electric power α3 is lower than the charging electric power α2 that is set in the process in step S410. When the CC charging is conducted at the charging electric power α3 and the electric power A3 is supplied to the heater 35, the electric power output from the charger 41 is a total value of the electric power α3, A3. Here, the total value of the electric power α3, A3 is set at the electric power β. It should be noted that, when the electric power is supplied to the auxiliary battery 34 and the auxiliary machine 33, this amount of the electric power can also be output from the charger 41.

In step S417, the battery ECU 51 transmits information indicating that the SOC of the main battery 10 is lower than the third threshold SOC_th3 and the heater relay 36 is off to the charging ECU 53. Accordingly, the charging ECU 53 conducts the CC charging by supplying the electric power β from the charger 41 to the main battery 10. After the process in step S417, the process is returned to step S412. When the CC charging is conducted at the electric power β, the electric power is not supplied to the heater 35. Thus, the electric power output from the charger 41 is the electric power β. It should be noted that, when the electric power is supplied to the auxiliary battery 34 and the auxiliary machine 33, this amount of the electric power can also be output from the charger 41.

In step S418, the battery ECU 51 detects the battery temperature TB by using the temperature sensor 23 and determines whether this battery temperature TB is lower than the predetermined temperature TB_th. When the battery temperature TB is lower than the predetermined temperature TB_th, the battery ECU 51 turns on the heater relay 36 in step S419. Here, the electric power supplied to the heater 35 is set at the electric power B. On the other hand, when the battery temperature TB is equal to or more than the predetermined temperature TB_th, the battery ECU 51 turns off the heater relay 36 in step S420.

In step S421, the battery ECU 51 outputs information indicating that the SOC of the main battery 10 is equal to or more than the third threshold SOC_th3 and the heater relay 36 is on to the charging ECU 53. Accordingly, the charging ECU 53 supplies the charging electric power γ to the main battery 10 and conducts the CCCV charging by controlling the operation of the charger 41. When the CCCV charging is conducted at the charging electric power γ and the electric power B is supplied to the heater 35, the electric power output from the charger 41 is the total value of the electric power γ, B. Here, the total value of the electric power γ, B is set at the electric power β. It should be noted that, when the electric power is supplied to the auxiliary battery 34 and the auxiliary machine 33, this amount of the electric power can also be output from the charger 41.

In step S422, the battery ECU 51 transmits information indicating that the SOC of the main battery 10 is equal to or more than the third threshold SOC_th3 and the heater relay 36 is off to the charging ECU 53. Accordingly, the charging ECU 53 supplies the charging electric power β to the main battery 10 and conducts the CCCV charging by controlling the operation of the charger 41. When the CCCV charging is conducted at the charging electric power β, the electric power is not supplied to the heater 35. Thus, the electric power output from the charger 41 is the electric power β. It should be noted that, when the electric power is supplied to the auxiliary battery 34 and the auxiliary machine 33, this amount of the electric power can also be output from the charger 41.

In step S423, the battery ECU 51 calculates the SOC of the main battery 10 and determines whether this SOC is equal to or more than the target value SOC_tag. When the SOC is lower than the target value SOC_tag, the process is returned to step S418, and the CCCV charging is continued. On the other hand, when the SOC is equal to or more than the target value SOC_tag, the battery ECU 51 transmits information indicating that the SOC of the main battery 10 is equal to or more than the target value SOC_tag to the charging ECU 53 and the PM-ECU 52 in step S424. Accordingly, the charging ECU 53 turns off the charging relays CHR-B, CHR-G. In addition, the PM-ECU 52 turns off the system main relays SMR-B, SMR-G. Here, when the heater relay 36 is on, the battery ECU 51 turns off the heater relay 36. In this way, the external charging can be terminated.

Figure 12:
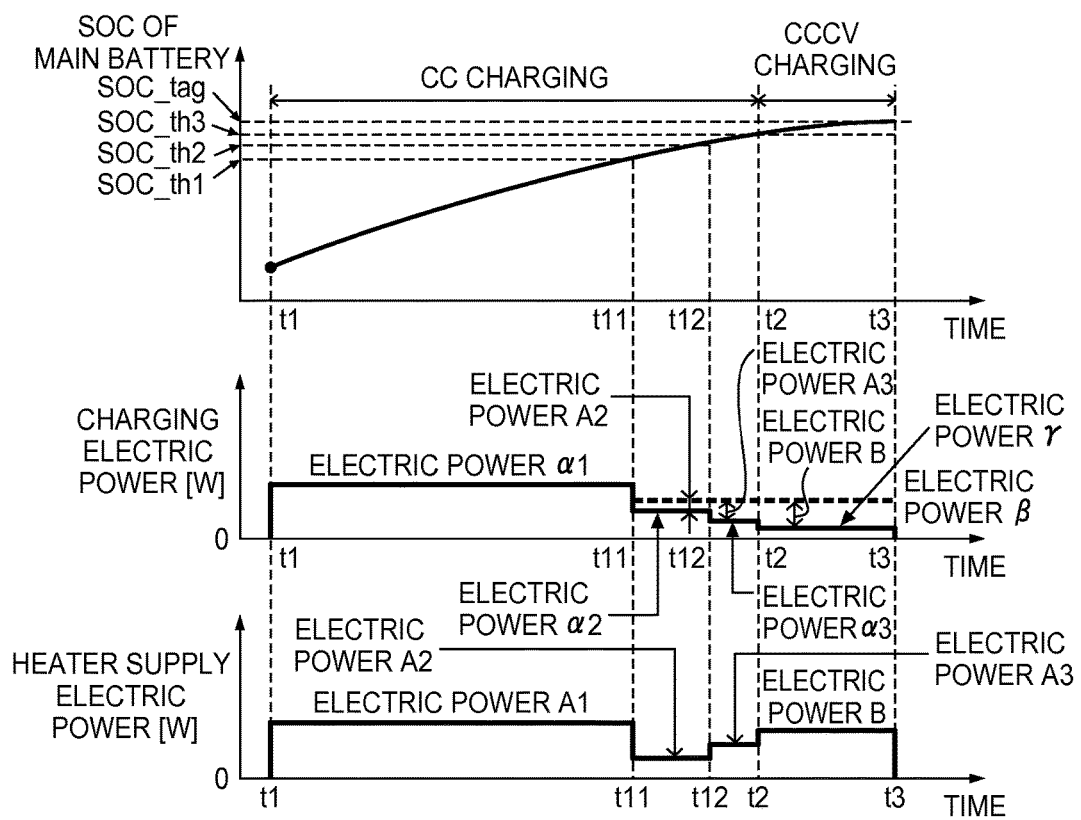
FIG. 12 is a diagram showing a change in the SOC of the main battery, a change in the charging electric power, and a change in the electric power supplied to the heater at the time that the heater is in the state that the electric power flows therethrough in Embodiment 3 of the invention.

FIG. 12 shows a change in the SOC of the main battery 10, a change in the charging electric power, and a change in the electric power supplied to the heater 35 at a time that the processes shown in FIG. 10 and FIG. 11 are performed. FIG. 12 is a chart that corresponds to FIG. 9.

The CC charging is conducted at the electric power α1 at the time t1 onward at which the external charging is started. The SOC of the main battery 10 is increased by conducting the CC charging at the electric power α1. In an example shown in FIG. 12, the electric power A1 is also supplied to the heater 35 at the time t1 onward.

At time t11, the SOC of the main battery 10 reaches the first threshold SOC_th1. At the time t11 onward, the CC charging is conducted at the electric power α2. In this way, the SOC of the main battery 10 is also increased at the time t11 onward. However, the charging electric power α2 is lower than the charging electric power α1. Thus, in terms of the amount of the increase in the SOC of the main battery 10 per unit time, the amount of the increase during the CC charging at the electric power α2 is smaller than the amount of the increase during the CC charging at the electric power α1.

Meanwhile, the electric power A2 is supplied to the heater 35 at the time t11 onward. Here, the total value of the electric power α2, A2 is the electric power β. That is, the electric power that is output from the charger 41 is the electric power β when the electric power β is supplied to the main battery 10 without supplying the electric power to the heater 35 and when the electric power A2, α2 is respectively supplied to the heater 35 and the main battery 10.

At time t12, the SOC of the main battery 10 reaches the second threshold SOC_th2. At the time t12 onward, the CC charging is conducted at the electric power α3. Accordingly, the SOC of the main battery 10 is also increased at the time t12 onward. However, the charging electric power α3 is lower than the charging electric power α2. Thus, in terms of the amount of the increase in the SOC of the main battery 10 per unit time, the amount of the increase during the CC charging at the electric power α3 is smaller than the amount of the increase during the CC charging at the electric power α2.

Meanwhile, the electric power A3 is supplied to the heater 35 at the time t12 onward. Here, the total value of the electric power α3, A3 is the electric power β. That is, the electric power that is output from the charger 41 is the electric power β when the electric power β is supplied to the main battery 10 without supplying the electric power to the heater 35 and when the electric power A3, α3 is respectively supplied to the heater 35 and the main battery 10.

At the time t2, the SOC of the main battery 10 reaches the third threshold SOC_th3. At the time t2 onward, the CCCV charging is conducted at the electric power γ. Accordingly, the SOC of the main battery 10 is also increased at the time t2 onward. The charging electric power γ is lower than the charging electric power α3. Thus, in terms of the amount of the increase in the SOC of the main battery 10 per unit time, the amount of the increase during the CCCV charging at the electric power γ is smaller than the amount of the increase during the CC charging at the electric power α3.

Meanwhile, the electric power B is supplied to the heater 35 at the time t2 onward. Here, the total value of the electric power γ, B is the electric power β. That is, the electric power that is output from the charger 41 is the electric power β when the electric power β is supplied to the main battery 10 without supplying the electric power to the heater 35 and when the electric power B, γ is respectively supplied to the heater 35 and the main battery 10. At the time t3, the SOC of the main battery 10 reaches the target value SOC_tag. At the time t3, the external charging is terminated.

In this embodiment, when the charging electric power is supplied to the main battery 10 without supplying the electric power to the heater 35, the charging electric power during the CC charging is reduced from the electric power α1 to the electric power β at the time t11. At the time t11 onward, the SOC of the main battery 10 is equal to or more than the first threshold SOC_th1 and approaches the target value SOC_tag. Thus, the SOC of the main battery 10 gradually approaches the target value SOC_tag by reducing the charging electric power during the CC charging.

On the other hand, when the electric power is supplied to the heater 35 and the main battery 10, as shown in FIG. 12, the charging electric power of the main battery 10 is reduced stepwise at the time t11 onward. In this way, the SOC of the main battery 10 gradually approaches the target value SOC_tag in consideration of the supply of the electric power to the heater 35.

In the case where the electric power is supplied to the heater 35 and the main battery 10 at the time t11 onward, the electric power supplied to the heater 35 is set such that the total value of the electric power supplied to the heater 35 and the main battery 10 is the electric power β. That is, the total value of the electric power A2, α2 is set at the electric power β in the time between the time t11 and the time t12, the total value of the electric power A3, α3 is set at the electric power β in the time between the time t12 and the time t2, and the total value of the electric power B, γ is set at the electric power β in the time between the time t2 and the time t3. Accordingly, the total value of the electric power that is supplied to the heater 35 and the main battery 10 is the electric power β and thus is constant in the time between the time t11 and the time t3. It should be noted that the total value of the electric power that is supplied to the heater 35 and the main battery 10 can be lower than the electric power β.

In this way, even in the case where the electric power to be supplied to the heater 35 is supplied to the main battery 10 by turning off the heater relay 36, the electric power β is only supplied to the main battery 10. The SOC of the main battery 10 approaches the target value SOC_tag at the time t11 onward. However, since the electric power β is only supplied to the main battery 10, the voltage value VB can be suppressed from becoming higher than the upper limit voltage value VB_lim.

In addition, the electric power supplied to the main battery 10 is reduced stepwise at the time t11 onward. Thus, when the total value of the electric power that is supplied to the heater 35 and the main battery 10 is set to be a constant value (the electric power β), the amount of the electric power that is supplied to the heater 35 can be increased by the amount of the reduction in the charging electric power of the main battery 10. In this way, the main battery 10 can easily be warmed by the heater 35.

Figure 13:
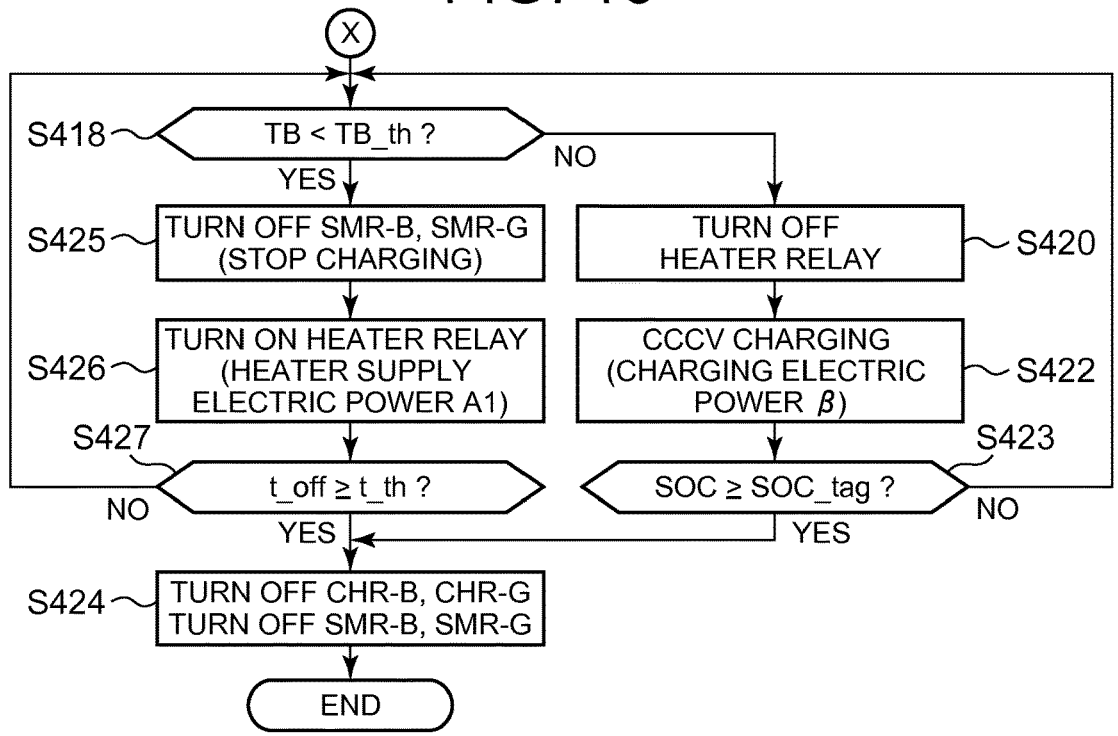
FIG. 13 is a flowchart showing a process of the external charging in a modified example of Embodiment 3 of the invention.

In this embodiment, the CCCV charging at the electric power γ is conducted in the time between the time t2 and the time t3. However, similar to Embodiment 1, the charging electric power may not be supplied to the main battery 10. More specifically, processes shown in FIG. 13 can be performed. FIG. 13 is a chart that corresponds to FIG. 11. In FIG. 13, the same processes as the processes described in FIG. 11 are denoted by the same reference numerals.

In step S418 shown in FIG. 13, when the battery temperature TB is lower than the predetermined temperature TB_th, the battery ECU 51 determines that the electric power needs to be supplied to the heater 35. In step S425, the battery ECU 51 transmits information indicating that the SOC of the main battery 10 is equal to or more than the third threshold SOC_th3 and the electric power needs to be supplied to the heater 35 to the PM-ECU 52. Then, the PM-ECU 52 turns off the system main relays SMR-B, SMR-G. In this way, the charging of the main battery 10 can be stopped.

In step S426, the battery ECU 51 turns on the heater relay 36. Here, the electric power supplied to the heater 35 is set at the electric power A1. In step S427, the battery ECU 51 obtains the time t_off, in which the system main relays SMR-B, SMR-G remain off, from the PM-ECU 52 and determines whether the time t_off is equal to or more than the predetermined time t_th. When the time t_off is shorter than the predetermined time t_th, the battery ECU 51 returns the process in step S418. On the other hand, when the time t_off is equal to or more than the predetermined time t_th, the battery ECU 51 performs the process in step S424.

Figure 14:
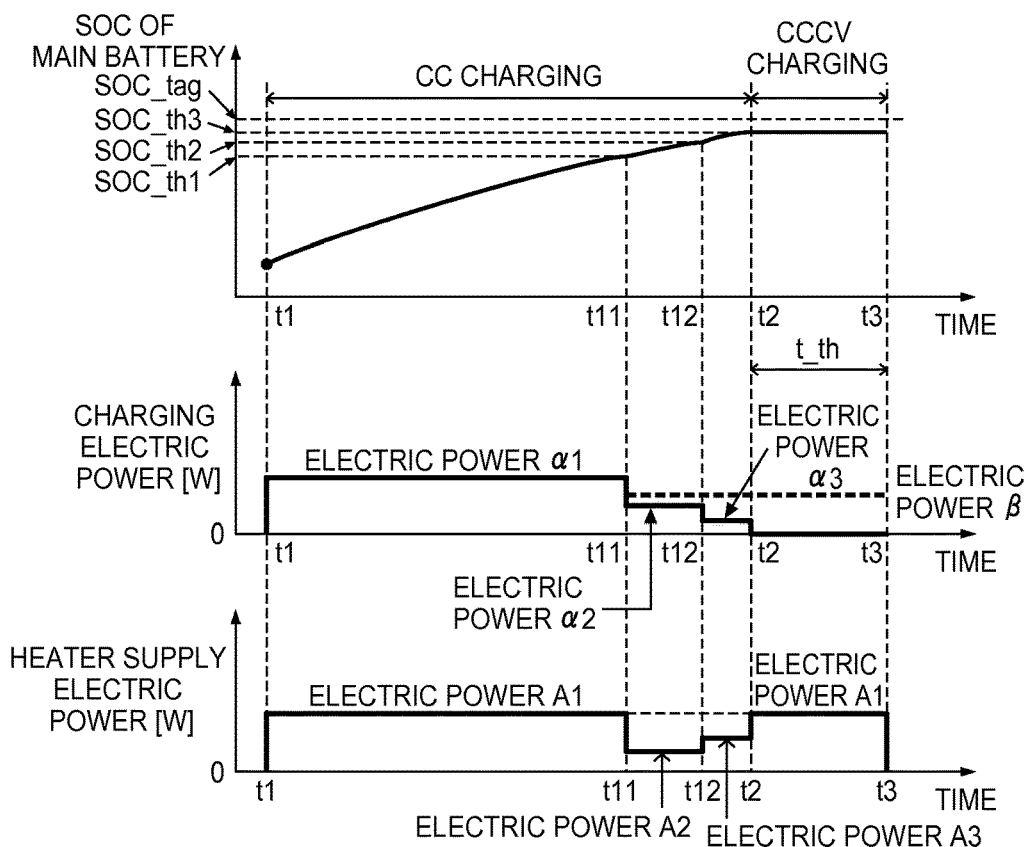
FIG. 14 is a diagram showing a change in the SOC of the main battery, a change in the charging electric power, and a change in the electric power supplied to the heater at the time that the heater is in the state that the electric power flows therethrough in the modified example of Embodiment 3 of the invention.

FIG. 14 shows a change in the SOC of the main battery 10, a change in the charging electric power, and a change in the electric power supplied to the heater 35 at a time that the processes shown in FIG. 10 and FIG. 13 are performed. FIG. 14 is a chart that corresponds to FIG. 12.

Similar to FIG. 12, in the time between the time t11 and the time t12, the CC charging is conducted at the electric power α2, and the electric power A2 is supplied to the heater 35. The total value of the electric power α2, A2 is the electric power β. In addition, in the time between the time t12 and the time t2, the CC charging is conducted at the electric power α3, and the electric power A3 is supplied to the heater 35. The total value of the electric power α3, A3 is the electric power β.

In the case where the battery temperature TB or the heater temperature TH becomes the abnormal state and thus the heater relay 36 is turned off by the process shown in FIG. 2 in the time between the time t11 and the time t2, the electric power supplied to the main battery 10 is the electric power β. As described above, even when the electric power β is supplied to the main battery 10, the voltage value VB can be suppressed from becoming higher than the upper limit voltage value VB_lim.

In the time between the time t2 and the time t3, the electric power is not supplied to the main battery 10, but the electric power A1 is supplied to the heater 35. In the case where the battery temperature TB or the heater temperature TH becomes the abnormal state and thus the heater relay 36 is turned off by the process shown in FIG. 2 in the time between the time t2 and the time t3, the electric power supplied to the main battery 10 is only the electric power A1 to be supplied to the heater 35. Accordingly, similar to Embodiment 1, even when the electric power A1 to be supplied to the heater 35 is supplied to the main battery 10, the voltage value VB can be suppressed from becoming higher than the upper limit voltage value VB_lim.

It should be noted that the CC charging is conducted at the three mutually different types of the charging electric power α1 to α3 until the SOC of the main battery 10 reaches the third threshold SOC_th3 in this embodiment. However, the invention is not limited thereto. That is, the CC charging can be conducted at two, four, or more mutually different types of the charging electric power until the SOC of the main battery 10 reaches the third threshold SOC_th3. Here, the CC charging is conducted while the charging electric power is reduced stepwise.

What is claimed is:

1. A battery system comprising:
a battery configured to be charged or discharged;
a temperature sensor configured to detect a temperature of the battery;
a heater configured to warm the battery;
a charger configured to supply electric power from an external power supply to the battery and the heater; and
a controller configured to control an operation of the charger, wherein
the controller is configured not to supply the electric power from the charger to the heater but to supply predetermined electric power from the charger to the battery in a case where an SOC of the battery is equal to or more than a threshold and the temperature of the battery is equal to or more than a predetermined temperature, and is configured to set a total value of the electric power that is supplied from the charger to the battery and the heater to be equal to or less than the predetermined electric power in a case where the SOC of the battery is equal to or more than the threshold and the temperature of the battery is lower than the predetermined temperature,
the controller is configured to conduct constant-current constant-voltage charging by supplying the electric power from the charger to the battery in a case where the SOC of the battery is equal to or more than the threshold, and to conduct constant-current charging by supplying the electric power from the charger to the battery in a case where the SOC of the battery is lower than the threshold,
the constant-current constant-voltage charging is a charging in which a charging current supplied from the charger to the battery is constant while a charging voltage applied from the charger to the battery is constant, and the charging current is less than a charging current supplied from the charger to the battery at a time when the constant-current charging is conducted, and
the controller is configured to set the total value of the electric power that is supplied from the charger to the battery and the heater to be less than the predetermined electric power in the case where the SOC of the battery is equal to or more than the threshold and the temperature of the battery is lower than the predetermined temperature.

2. A battery system comprising:
a battery configured to be charged or discharged;
a temperature sensor configured to detect a temperature of the battery;
a heater configured to warm the battery;
a charger configured to supply electric power from an external power supply to the battery and the heater; and
a controller configured to control an operation of the charger, wherein
the controller is configured not to supply the electric power from the charger to the heater but to supply predetermined electric power from the charger to the battery in a case where an SOC of the battery is equal to or more than a threshold and the temperature of the battery is equal to or more than a predetermined temperature, and is configured to set a total value of the electric power that is supplied from the charger to the battery and the heater to be equal to or less than the predetermined electric power in a case where the SOC of the battery is equal to or more than the threshold and the temperature of the battery is lower than the predetermined temperature,
in a case where the SOC of the battery is equal to or more than the threshold and the temperature of the battery is lower than the predetermined temperature, the controller is configured to conduct constant-current constant-voltage charging and set a total value of the electric power supplied from the charger to the battery and the heater to a constant value that is equal to or less than the predetermined electric power after conducting constant-current charging while the electric power that is supplied from the charger to the battery is reduced stepwise in a range that is lower than the predetermined electric power,
the constant-current constant-voltage charging is a charging in which a charging current supplied from the charger to the battery is constant while a charging voltage applied from the charger to the battery is constant, and the charging current is less than a charging current supplied from the charger to the battery at a time when the constant-current charging is conducted, and
the controller is configured to set the total value of the electric power that is supplied from the charger to the battery and the heater to be less than the predetermined electric power in the case where the SOC of the battery is equal to or more than the threshold and the temperature of the battery is lower than the predetermined temperature.

* * * * *